(12) United States Patent
Seregin et al.

(10) Patent No.: US 11,206,396 B2
(45) Date of Patent: Dec. 21, 2021

(54) LOCAL ILLUMINATION COMPENSATION IN VIDEO CODING

(71) Applicant: QUALCOMM Incorporated, San Diego, CA (US)

(72) Inventors: Vadim Seregin, San Diego, CA (US); Wei-Jung Chien, San Diego, CA (US); Hongtao Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/735,456

(22) Filed: Jan. 6, 2020

(65) Prior Publication Data

US 2020/0228796 A1     Jul. 16, 2020

Related U.S. Application Data

(60) Provisional application No. 62/793,334, filed on Jan. 16, 2019.

(51) Int. Cl.
*H04N 19/107* (2014.01)
*H04N 19/159* (2014.01)
(Continued)

(52) U.S. Cl.
CPC ......... *H04N 19/107* (2014.11); *H04N 19/132* (2014.11); *H04N 19/159* (2014.11); *H04N 19/176* (2014.11); *H04N 19/70* (2014.11)

(58) Field of Classification Search
None
See application file for complete search history.

(56) References Cited

U.S. PATENT DOCUMENTS

| 10,462,483 B1* | 10/2019 | Xu | ....................... H04N 19/593 |
| 2014/0139627 A1* | 5/2014 | Chen | ................... H04N 19/176 |
| | | | 348/43 |

(Continued)

OTHER PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V6, 301 Pages.

(Continued)

*Primary Examiner* — Kate H Luo
(74) *Attorney, Agent, or Firm* — Campbell C. Chiang; Shumaker & Sieffert, P.A.

(57) ABSTRACT

An example method of coding video data includes selecting, by one or more processors a sub-set of a plurality of neighboring samples of a current block in a current picture, wherein the plurality of neighboring samples includes a row of samples adjacent to a top row of the current block in the current picture and a column of samples adjacent to a left column of the current block in the current picture; deriving, by the one or more processors and based on the sub-set of the plurality of neighboring samples in the current picture, local illumination compensation (LIC) parameters for the current block; and performing, by the one or more processors and based on the LIC parameters, LIC on samples of the current block to generate compensated samples of the current block.

22 Claims, 22 Drawing Sheets

(51) Int. Cl.
*H04N 19/132* (2014.01)
*H04N 19/70* (2014.01)
*H04N 19/176* (2014.01)

(56) References Cited

U.S. PATENT DOCUMENTS

| | | | | |
|---|---|---|---|---|
| 2015/0350642 | A1* | 12/2015 | Park | H04N 19/136 |
| | | | | 375/240.12 |
| 2015/0382009 | A1* | 12/2015 | Chen | H04N 19/573 |
| | | | | 375/240.16 |
| 2019/0200021 | A1* | 6/2019 | Park | H04N 19/132 |
| 2019/0246133 | A1* | 8/2019 | Lee | H04N 19/107 |
| 2020/0162761 | A1* | 5/2020 | Andersson | H04N 19/176 |
| 2020/0244990 | A1* | 7/2020 | Bordes | H04N 19/583 |
| 2020/0280727 | A1* | 9/2020 | Bordes | H04N 19/52 |

OTHER PUBLICATIONS

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-V8, 400 pp.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16); URL: http://phenix.int-evry.fr/jvet/,, No. JVET-A1001 Feb. 24, 2016 (Feb. 24, 2016), XP030150000, 27 pages.

Chen X., et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, pp. 1-4.

Chiu Y-J., et al., "Decoder-side Motion Estimation and Wiener Filter for HEVC", 2013 Visual Communications And Image Processing (VCIP), IEEE, Nov. 17, 2013 (Nov. 17, 2013), pp. 1-6, XP032543658, DOI: 10.1109/VCIP.2013.6706446 [retrieved on Jan. 8, 2014].

Ergen S., "ZigBee/IEEE 802.15.4 Summary", Sep. 10, 2004, 37 Pages.

IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology—Telecommunications and information exchange between systems Local and metropolitan area networks—Specific requirements; Sponsored by LAN/MAN Standards Committee; IEEE Standard 802.11acTM-2013, Published on Dec. 18, 2013, 425 Pages.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Kamp S., et al., "Decoder-Side Motion Vector Derivation for Block-Based Video Coding", IEEE transactions on circuits and systems for video technology, vol. 22, No. 12, 2012, pp. 1732-1745.

Kim U.S., et al., "New Frame Rate Up-Conversion Algorithms With Low Computational Complexity", IEEE Transactions on circuits and systems for video technology, Mar. 2014, vol. 24, No. 3, pp. 384-393.

Lee W.H., et al., "Frame Rate Up Conversion Based on Variational Image Fusion", IEEE Transactions on Image processing, Jan. 2014, vol. 23, No. 1, pp. 399-412.

Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-V1, 15th Meeting: Gothenburg, SE, Jul. 3-12, 2019, pp. 1-5.

Seregin V., et al., "CE1: Unidirectional Illumination Compensation (CE1-5.1)", Joint Video Experts Team (JVET) of ITU-T SG 16 WP 3 and ISO/IEC JTC 1/SC 29/WG 11, JVET-N0343-V3, 14th Meeting, Mar. 19-27, 2019, 3 pages.

Tech G., et al., "3D-HEVC Draft Text 7," Joint Collaborative Team on 3D Video Coding Extensions of ITU-T SG 16 WP 3 and ISO/IEC JTC 1/SC 29/WG 11, Feb. 12-18, 2015, Document: JCT3V-K1001-V7, 113 pp.

* cited by examiner

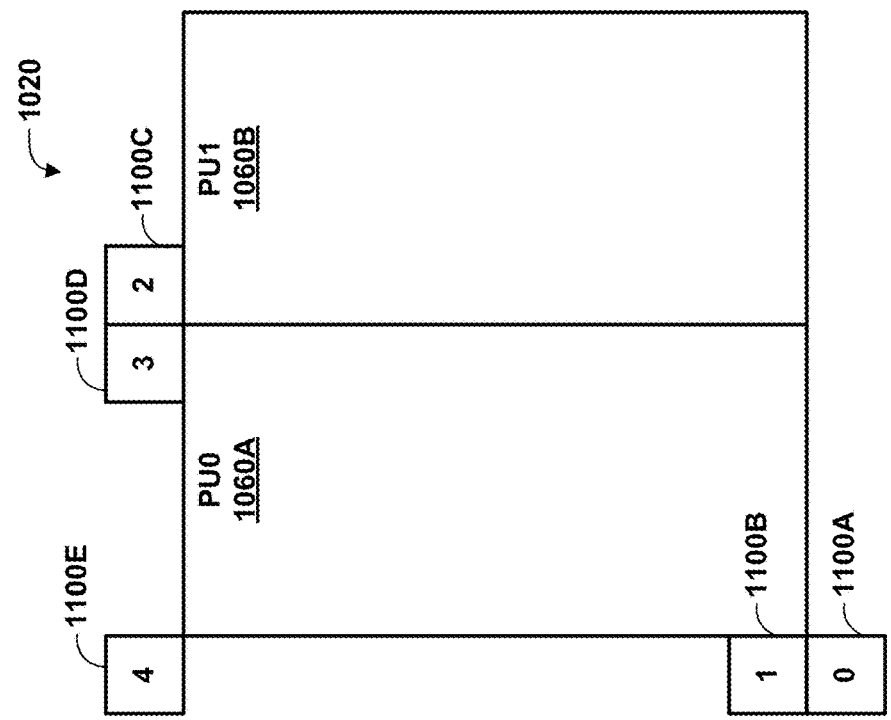
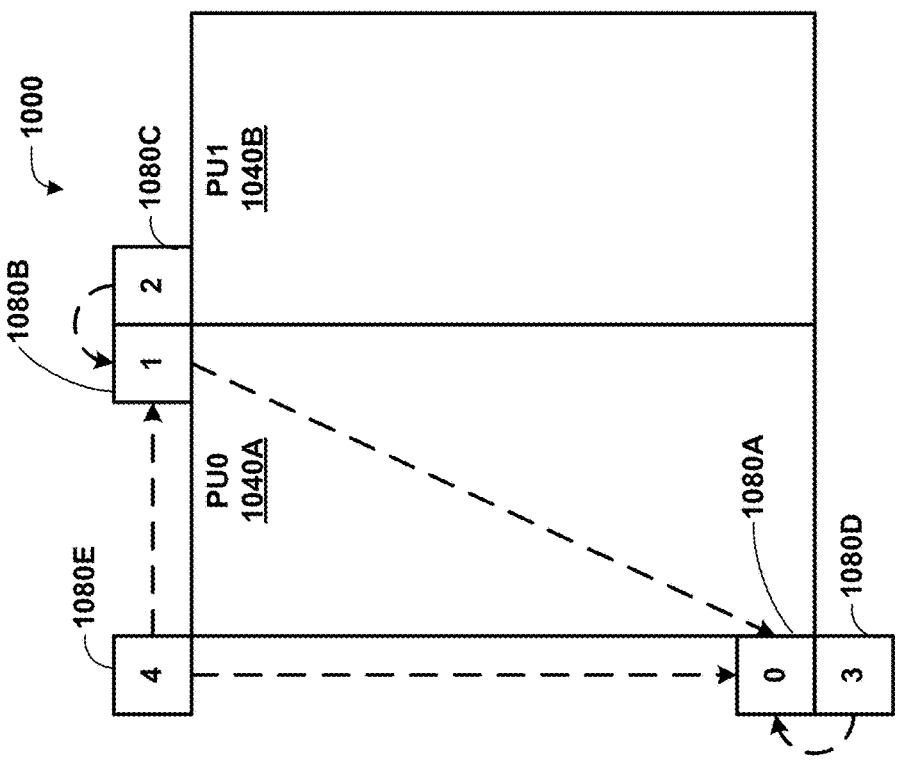
FIG. 2B
FIG. 2A

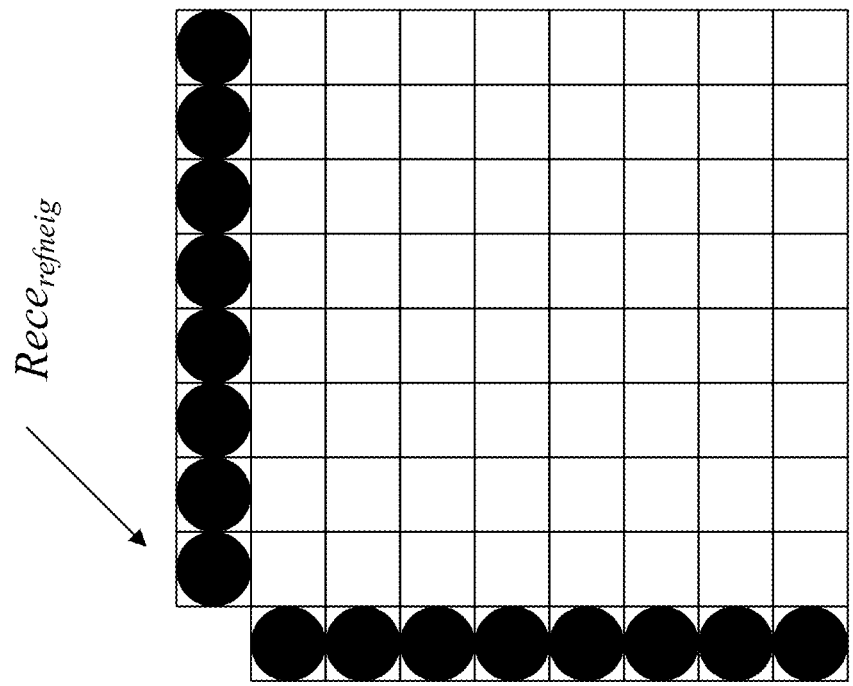
FIG. 4B Reference block
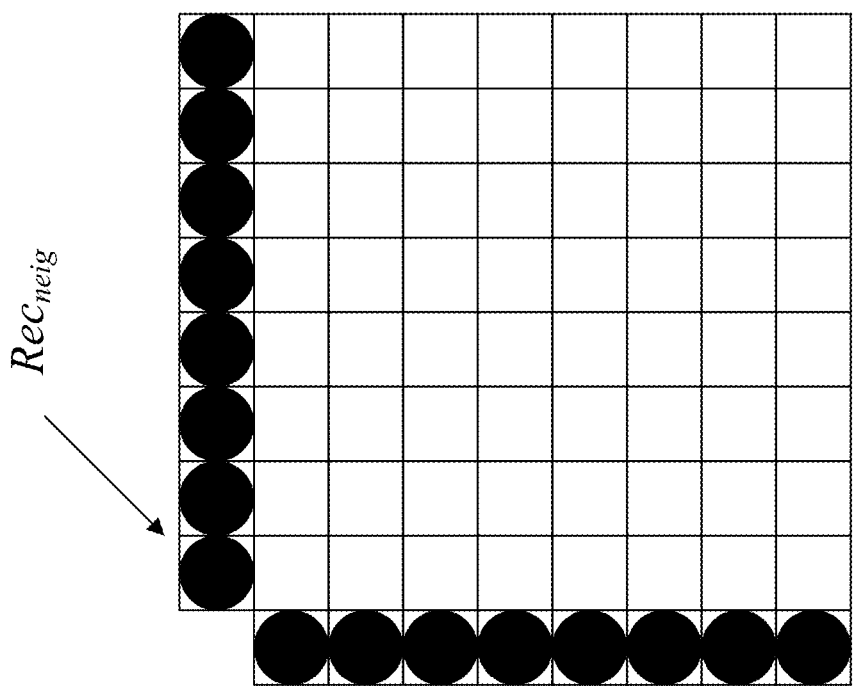
FIG. 4A Current CU

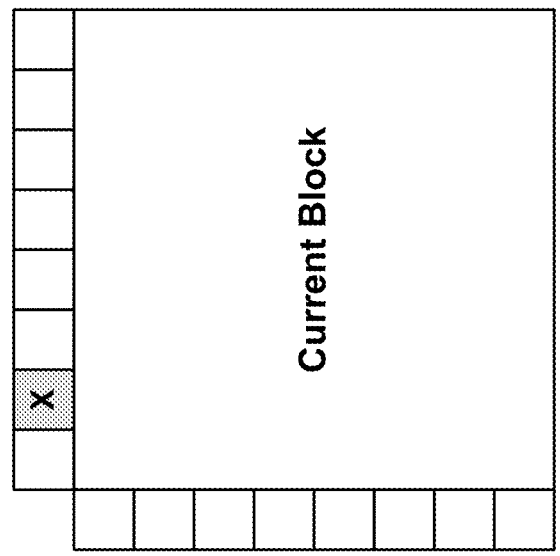
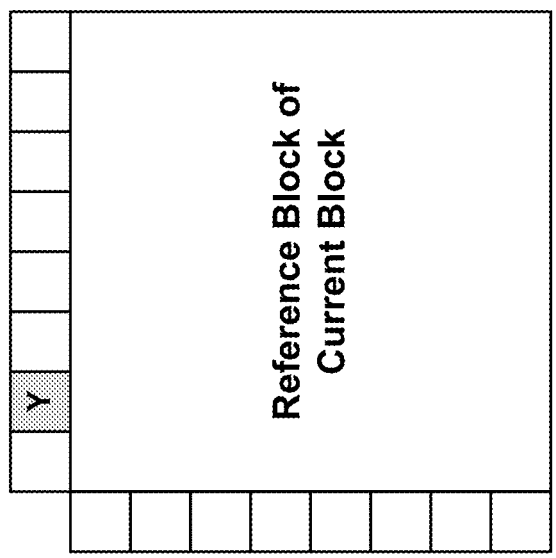
FIG. 16

LOCAL ILLUMINATION COMPENSATION IN VIDEO CODING

This application claims the benefit of U.S. Provisional Patent Application 62/793,334, filed on Jan. 16, 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to an improvement on the local illumination compensation in block-based video coding. For example, a video coder (e.g., video encoder or video decoder) may be configured to determine a sub-set of neighboring samples for deriving local illumination compensation information for the current block. In this way, the video coder may more quickly derive local illumination compensation information compared to systems that wait for samples immediately adjacent to the current block to be available. One or more techniques described herein for local illumination compensation, may be applied to any of the existing video codecs, such as HEVC (High Efficiency Video Coding) or H.266/Versatile Video Coding (VVC) standard, or be may be used in any future video coding standards.

In one example, a method of coding video data includes: selecting, by one or more processors, a set of a plurality of neighboring samples of a current block in a current picture, wherein the plurality of neighboring samples includes a row of samples adjacent to a top row of the current block in the current picture and a column of samples adjacent to a left column of the current block in the current picture, wherein selecting the sub-set of neighboring samples comprises: excluding, from the set of neighboring samples, samples in the row of samples adjacent to the top row of the current block that are reconstructed based on other samples in the current picture; and excluding, from the set of neighboring samples, samples in the column of samples adjacent to the left column of the current block that are reconstructed based on other samples in the current picture; deriving, by the one or more processors and based on the set of the plurality of neighboring samples in the current picture, local illumination compensation (LIC) parameters for the current block; and performing, by the one or more processors and based on the LIC parameters, LIC on samples of the current block to generate compensated samples of the current block.

In another example, an apparatus for processing video data includes one or more storage media; and one or more processors implemented in circuitry and configured to: select a set of a plurality of neighboring samples of a current block in a current picture, wherein the plurality of neighboring samples includes a row of samples adjacent to a top row of the current block in the current picture and a column of samples adjacent to a left column of the current block in the current picture, wherein, to select the sub-set of neighboring samples, the one or more processors are configured to: exclude, from the set of neighboring samples, samples in the row of samples adjacent to the top row of the current block that are reconstructed based on other samples in the current picture; and exclude, from the set of neighboring samples, samples in the column of samples adjacent to the left column of the current block that are reconstructed based on other samples in the current picture; derive, based on the set of the plurality of neighboring samples in the current picture, local illumination compensation (LIC) parameters for the current block; and perform, based on the LIC parameters, LIC on samples of the current block to generate compensated samples of the current block.

In another example, a device for processing video data includes means for selecting a set of a plurality of neighboring samples of a current block in a current picture, wherein the plurality of neighboring samples includes a row of samples adjacent to a top row of the current block in the current picture and a column of samples adjacent to a left column of the current block in the current picture, wherein the means for selecting comprise: means for excluding, from the set of neighboring samples, samples in the row of samples adjacent to the top row of the current block that are reconstructed based on other samples in the current picture; and means for excluding, from the set of neighboring samples, samples in the column of samples adjacent to the left column of the current block that are reconstructed based on other samples in the current picture; means for deriving, based on the set of the plurality of neighboring samples in the current picture, local illumination compensation (LIC) parameters for the current block; and means for performing, based on the LIC parameters, LIC on samples of the current block to generate compensated samples of the current block.

In another example, a computer-readable storage medium stores instructions that, when executed, cause one or more processors to select a set of a plurality of neighboring samples of a current block in a current picture, wherein the plurality of neighboring samples includes a row of samples adjacent to a top row of the current block in the current picture and a column of samples adjacent to a left column of the current block in the current picture, wherein the instructions that cause the one or more processors to select the sub-set of neighboring samples comprise instructions that cause the one or more processors to: exclude, from the set of neighboring samples, samples in the row of samples adjacent to the top row of the current block that are reconstructed based on other samples in the current picture; and exclude, from the set of neighboring samples, samples in the column of samples adjacent to the left column of the current block that are reconstructed based on other samples in the current picture; derive, based on the set of the plurality of neighboring samples in the current picture, local illumination compensation (LIC) parameters for the current block; and perform, based on the LIC parameters, LIC on samples of the current block to generate compensated samples of the current block.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 2A and 2B are conceptual diagrams illustrating spatial neighboring candidates in HEVC.

FIGS. 4A and 4B are conceptual diagrams illustrating neighboring pixels used to estimate parameters in an illumination compensation (IC) model.

FIG. 16 is a conceptual diagram illustrating an example of relative position.

DETAILED DESCRIPTION

In general, this disclosure describes techniques related to improvements to the local illumination compensation (LIC) in block-based video coding. Such techniques may be applied to current or future video coding standards, including the Versatile Video Coding (VVC) standard presently under development.

When applying LIC techniques, a video coder (e.g., a video encoder, a video decoder, etc.) may access neighboring reconstructed samples adjacent to a current block. In some hardware architectures, these samples may not yet have been reconstructed (e.g., when the current block is conducting motion compensation), and thus, may be unavailable. In this case, the motion compensation procedure of the current block may be delayed until the video coder reconstructs the neighboring samples, resulting in an undesirable delay in the timeline.

In accordance with techniques described herein, a video coder may be configured to select a sub-set of neighboring samples for deriving LIC parameters for a current block of a current picture. For instance, the video coder may select neighboring samples that are available at the time the current block is being processed. A sample may be considered to be available where the sample is not reconstructed based on other samples in the current picture. In this way, the video coder may help to ensure that the neighboring samples will be available (e.g., not blocked, delayed, etc.) such that the video coder may immediately perform a motion compensation procedure of the current block. In this way, the video coder may improve a processing speed of the video coder and/or reduce a power consumption of the video coder.

Various techniques in this disclosure may be described with reference to a video coder or with reference to video coding, which are intended to be generic terms that can refer to either a video encoder and video encoding or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

Figure 1:
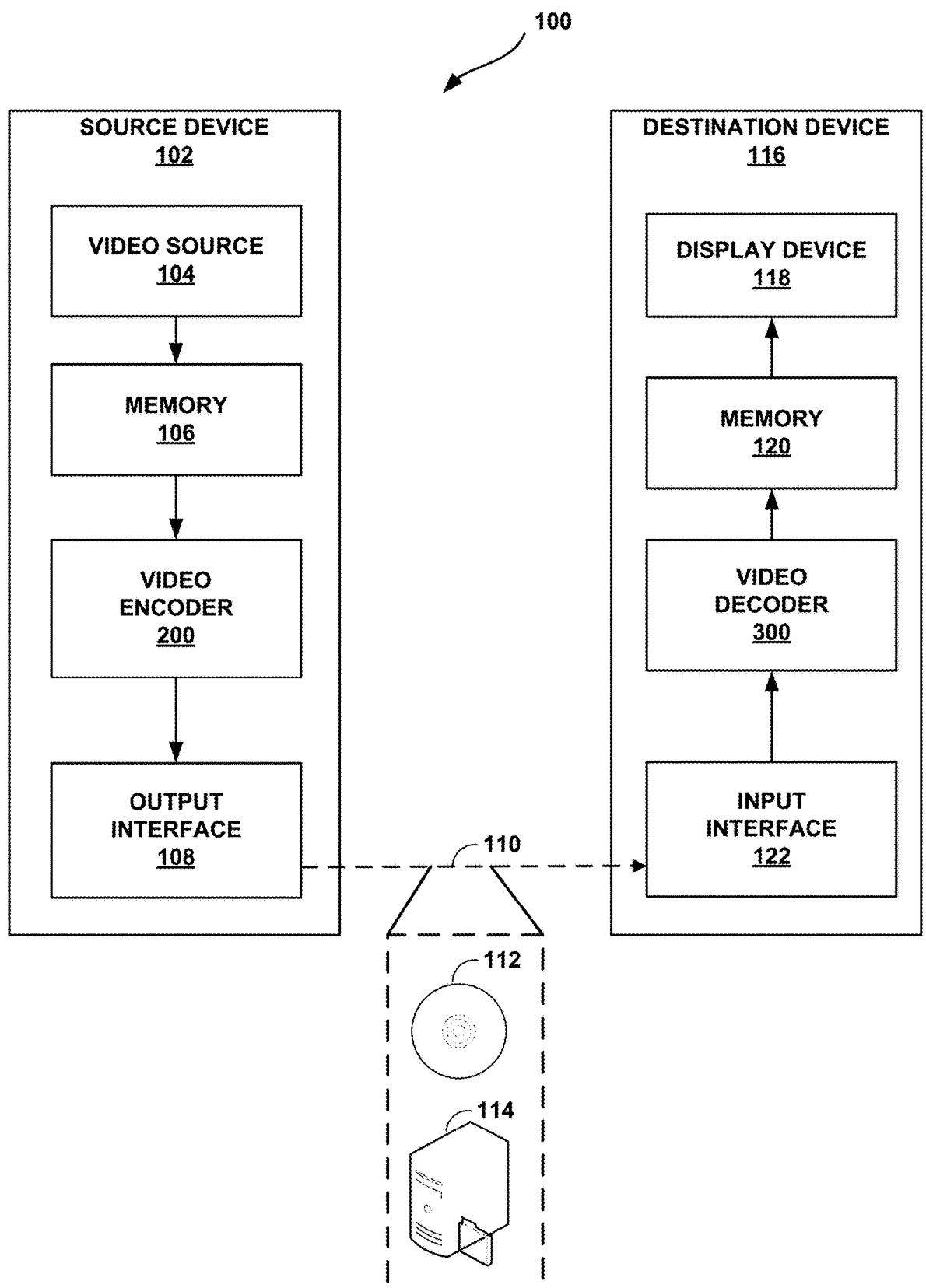
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for local illumination compensation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for local illumination compensation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU.

The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

For each block, a set of motion information may be available. A set of motion information may include motion information for forward and backward prediction directions. In this example, forward and backward prediction directions may be two prediction directions of a bi-directional prediction mode and the terms "forward" and "backward" may not have a geometry meaning. For example, the terms "forward" and "backward" may correspond to reference picture list 0 (RefPicList0) and reference picture list 1 (RefPicList1) of a current picture. When only one reference picture list is available for a picture or slice, only RefPicList0 may be available and the motion information of each block of a slice may be forward.

In some examples, video decoder 300 may use a motion vector together with the motion vector's reference index in decoding processes, such a motion vector with the associated reference index is denoted as a uni-predictive set of motion information.

For each prediction direction, the motion information may include a reference index and a motion vector. In some cases, for simplicity, a motion vector itself may be referred to as having an associated reference index. Video encoder 200 and/or video decoder 300 may use a reference index may to identify a reference picture in the current reference picture list (RefPicList0 or RefPicList1). A motion vector may have a horizontal and a vertical component.

Video encoder 200 and/or video decoder 300 may use picture order count (POC) in video coding standards to identify a display order of a picture. Although there are cases two pictures within one coded video sequence may have the same POC value, such cases typically do not happen within a coded video sequence. When multiple coded video sequences are present in a bitstream, pictures with a same value of POC may be closer to each other in terms of decoding order.

Video encoder 200 and/or video decoder 300 may use POC values of pictures for reference picture list construction, derivation of reference picture set as in HEVC, and motion vector scaling.

In H.264/AVC, video encoder 200 and/or video decoder 300 may partition each inter macroblock (MB) into the following four different ways: (1) 16×16 MB partition; (2) 16×8 MB partitions; (3) 8×16 MB partitions; and (4) 8×8 MB partitions. Different MB partitions in one MB may have different reference index values for each direction (RefPicList0 or RefPicList1). When an MB is not partitioned into four 8×8 MB partitions, the MB may have only one motion vector for each MB partition in each direction.

When an MB is partitioned into four 8×8 MB partitions, video encoder 200 and/or video decoder 300 may further partition each 8×8 MB partition into sub-blocks, each of which can have a different motion vector in each direction. For example, video encoder 200 and/or video decoder 300 may get sub-blocks from an 8×8 MB partition: (1) 8×8 sub-block; (2) 8×4 sub-blocks; (3) 4×8 sub-blocks; and (4) 4×4 sub-blocks. Each sub-block may have a different motion vector in each direction. Therefore, a motion vector may be present in a level equal to higher than sub-block.

In AVC, video encoder 200 and/or video decoder 300 may enable temporal direct mode in either a MB or a MB partition level for skip or direct mode in B slices. For each MB partition, video encoder 200 and/or video decoder 300 may use the motion vectors of the block co-located with the current MB partition in the RefPicList1[0] of the current block to derive the motion vectors. Video encoder 200 and/or video decoder 300 may scale each motion vector in the co-located block based on POC distances. In AVC, a direct mode can also predict motion information from the spatial neighbors.

In HEVC, the largest coding unit in a slice is called a coding tree block (CTB). A CTB includes a quad-tree, the nodes of which are coding units. The size of a CTB may range from 16×16 to 64×64 in the HEVC main profile (although technically 8×8 CTB sizes may be supported). A coding unit (CU) may be the same size of a CTB although and as small as 8×8. Video encoder 200 and/or video decoder 300 may code each coding unit with one mode. When a CU is inter coded, video encoder 200 and/or video decoder 300 may further partition the CU into 2 or 4 prediction units (PUs) or cause the CU to become just one PU when further partitioning does not apply. When two PUs are present in one CU, they can be half size rectangles or two rectangle size with ¼ or ¾ size of the CU.

When the CU is inter coded, one set of motion information is present for each PU. In addition, video encoder 200 and/or video decoder 300 may code each PU with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU).

In either AMVP or merge mode, video encoder 200 and/or video decoder 300 may maintain a motion vector (MV) candidate list for multiple motion vector predictors. The motion vector(s), as well as reference indices in the merge mode, of the current PU are generated by taking one candidate from the MV candidate list. The MV candidate list may include up to 5 candidates for the merge mode and only two candidates for the AMVP mode. A merge candidate may include a set of motion information, e.g., motion vectors corresponding to both reference picture lists (list 0 and list 1) and the reference indices. If a merge candidate is identified by a merge index, video encoder 200 and/or video decoder 300 may use the reference pictures for the prediction of the current blocks, as well as the associated motion vectors are determined. However, under AMVP mode for each potential prediction direction from either list 0 or list 1, video encoder 200 may explicitly signal a reference index, together with an MVP index to the MV candidate list since the AMVP candidate may include only a motion vector. In AMVP mode, the predicted motion vectors can be further refined.

As can be seen above, a merge candidate may correspond to a full set of motion information while an AMVP candidate may include just one motion vector for a specific prediction direction and reference index. Video encoder 200 and/or video decoder 300 may derive the candidates for both modes similarly from the same spatial and temporal neighboring blocks.

FIGS. 2A and 2B are conceptual diagrams illustrating spatial neighboring candidates in HEVC. Spatial MV candidates are derived from the neighboring blocks shown on FIGS. 2A and 2B, for a specific PU (PU0), although the methods of generating the candidates from the blocks differ for merge and AMVP modes.

In merge mode, up to four spatial MV candidates can be derived with the orders shown in FIG. 2A with numbers, and the order is the following: left (0, A1), above (1, B1), above-right (2, B0), below-left (3, A0), and above left (4, B2), as shown in FIG. 1A. That is, in FIG. 2A, block 1000 includes PU0 1040A and PU1 1040B. When a video coder is to code motion information for PU0 1040A using merge mode, the video coder adds motion information from spatial neighboring blocks 1080A, 1080B, 1080C, 1080D, and 1080E to a candidate list, in that order. Blocks 1080A, 1080B, 1080C, 1080D, and 108E may also be referred to as, respectively, blocks A1, B1, B0, A0, and B2, as in HEVC.

In AMVP mode, the neighboring blocks are divided into two groups: a left group including blocks 0 and 1, and an above group including blocks 2, 3, and 4 as shown on FIG. 1B. These blocks are labeled, respectively, as blocks 1100A, 1100B, 1100C, 1100D, and 1100E in FIG. 1B. In particular, in FIG. 1B, block 1020 includes PU0 1060A and PU1 1060B, and blocks 1100A, 1100B, 1100C, 1100D, and 1100E represent spatial neighbors to PU0 1060A. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

A temporal motion vector predictor (TMVP) candidate, if enabled and available, is added into the MV candidate list after spatial motion vector candidates. The process of motion vector derivation for a TMVP candidate is the same for both merge and AMVP modes; however, the target reference index for the TMVP candidate in the merge mode is always set to 0. The primary block location for TMVP candidate derivation is the bottom right block outside of the collocated PU (shown as block "T" in FIG. 3A) to compensate the bias to the above and left blocks used to generate spatial neighboring candidates. However, if that block is located outside of the current CTB row or motion information is not available, the block is substituted with a center block of the PU.

Figure 3A:
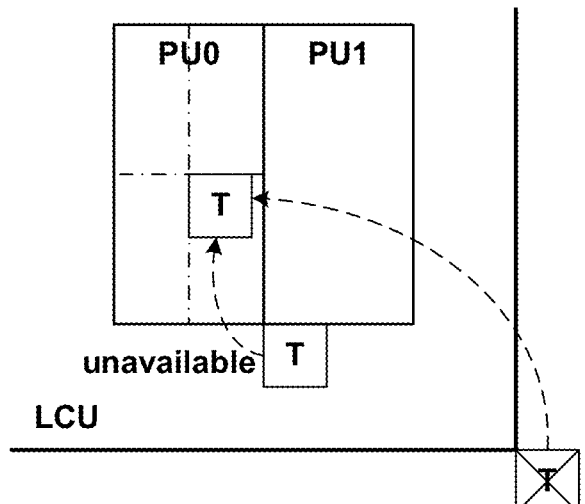
FIGS. 3A and 3B are conceptual diagrams illustrating example temporal motion vector predictor (TMVP) candidates and motion vector (MV) scaling.
Figure 3B:
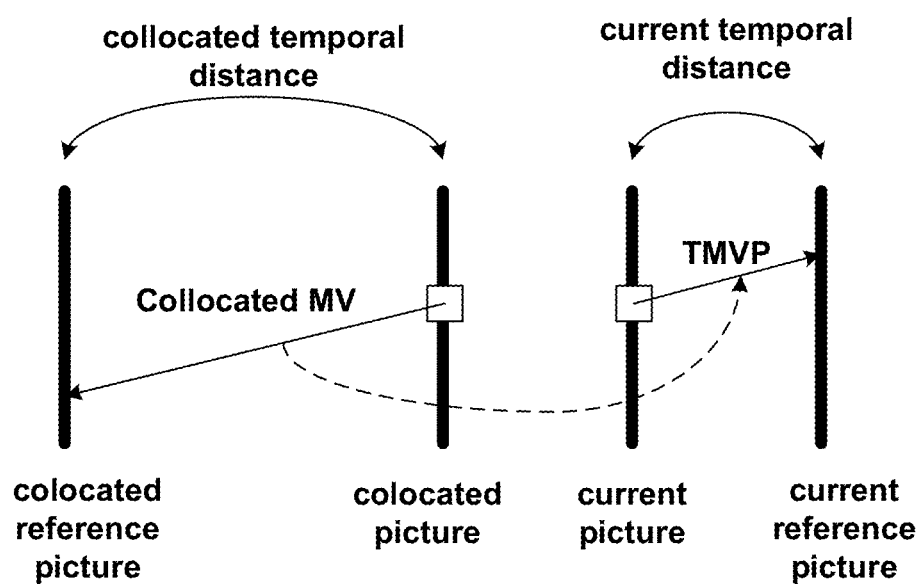

As shown in FIG. 3B, a motion vector for a TMVP candidate is derived from the co-located PU of the co-located picture, indicated in the slice level. Similar to temporal direct mode in AVC, a motion vector of the TMVP candidate may have motion vector scaling performed to compensate the distance differences.

Merge candidate list generation in HEVC. As shown in FIG. 2A, the order is the following: left (0), above (1), above right (2), below left (3). If one of them is unavailable, check above left (4).

Then, check the temporal candidate as shown in FIG. 3A, check the bottom-right at firs, if not available, check the center block.

If the list size <5, add additional candidates to fix the list size equal to 5.

Motion vector scaling is discussed in the following. In some examples, the value of motion vectors is proportional to the distance of pictures in the presentation time. A motion vector associates two pictures, the reference picture, and the picture containing the motion vector (namely, the containing picture). When a motion vector is utilized to predict the other motion vector, video encoder 200 and/or video decoder 300 may calculate the distance of the containing picture and the reference picture based on the Picture Order Count (POC) values.

For a motion vector to be predicted, both the motion vector's associated containing picture and reference picture may be different. Therefore, in some examples, video encoder 200 and/or video decoder 300 may calculate a new distance (e.g., based on POC). In this example, video encoder 200 and/or video decoder 300 may scale the motion vector based on these two POC distances. For a spatial neighboring candidate, the containing pictures for the two motion vectors are the same, while the reference pictures are different. In HEVC, motion vector scaling may apply to both TMVP and AMVP for spatial and temporal neighboring candidates.

Artificial motion vector candidate generation is discussed in the following. If a motion vector candidate list is not complete, video encoder 200 and/or video decoder 300 may generate artificial motion vector candidates. In this example, video encoder 200 and/or video decoder 300 may insert the artificial motion vector candidates at the end of the list until the video encoder 200 and/or video decoder 300 will have all candidates.

In merge mode, there are two types of artificial MV candidates: combined candidate derived only for B-slices and zero candidates used only for AMVP if the first type doesn't provide enough artificial candidates. For each pair of candidates that are already in the candidate list and have necessary motion information, video encoder 200 and/or video decoder 300 may derive bi-directional combined motion vector candidates by a combination of the motion vector of the first candidate referring to a picture in the list 0 and the motion vector of a second candidate referring to a picture in the list 1.

The pruning process for candidate insertion is discussed in the following. Candidates from different blocks may happen to be the same, which decreases the efficiency of a merge/AMVP candidate list. Video encoder 200 and/or video decoder 300 may apply a pruning process to solve this problem. In the pruning process, video encoder 200 and/or video decoder 300 may compare one candidate against the others in the current candidate list to avoid inserting identical candidates in certain extent. To reduce the complexity, video encoder 200 and/or video decoder 300 may apply only limited numbers of pruning processes instead of comparing each potential candidate with all the other existing candidates.

Video encoder 200 and/or video decoder 300 may enable and disable weighted prediction at the slice level, and video encoder 200 may also signal weighted prediction parameters at the slice level. In contrast, video encoder 200 and/or video decoder 300 may enable and disable Partition Based Illumination Compensation (PBIC) and the PU level, and video encoder 200 may signal IC parameters at the PU level to handle the local illumination variation.

Similar to when using WP, video encoder 200 and/or video decoder 300 may use a scaling factor (also denoted by a) and an offset (also denoted by b) in IC, and the shift number is fixed to be 6. Source device 102 may code an IC flag for each PU to indicate whether IC applies for current PU or not. If IC applies for the PU, source device 102 signals a set of IC parameters (i.e., a and b) to the decoder (e.g., destination device 116) and the decoder uses the set of IC parameters for motion compensation. In the bi-prediction case, video encoder 200 may signal two scaling factors (one for each prediction direction) and one offset. To save bits spent on IC parameters, video encoder 200 and/or video decoder 300 may use a chroma component that shares the scaling factors with luma component and a fixed offset 128.

In 3D-HEVC, as described in G. Tech, K. Wegner, Y. Chen and S. Yea, "3D-HEVC Draft Text 7", Joint Collaborative Team on 3D Video Coding Extensions (JCT-3V) Doc., JCT3V-K1001, 11th Meeting: Geneva, Switzerland, 12-18 Feb. 2015, IC is enabled for inter-view prediction. Different from WP and PBIC which signals IC parameters explicitly, when using 3D-HEVC, video encoder 200 and/or video decoder 300 may derive IC parameters based on neighboring samples of a current CU and neighboring samples of a reference block.

In some examples, video encoder 200 and/or video decoder 300 may only apply IC on a 2N×2N partition mode. For AMVP mode, video encoder 200 may signal one IC flag for each CU that is predicted from inter-view reference picture. For merge mode, to save bits, video encoder 200 may signal an IC flag only when merge index of the PU is not equal to 0.

In some examples, IC is not performed for a CU that is only predicted from temporal reference pictures.

Linear IC model used in inter-view prediction is shown in Eq. (1):

$$p(i,j)=a*r(i+dv_x, j+dv_y)+b), \text{ where } (i,j)\in PU_c \quad (1)$$

Here, $PU_c$ is the current PU, (i, j) is the coordinate of pixels in $PU_c$, $(dv_x, dv_y)$ is the disparity vector (e.g., motion vector) of $PU_c$. p(i, j) is the prediction of $PU_c$, r is the PU's reference picture from neighboring view. a and b are parameters of the linear IC model.

FIGS. 4A and 4B are conceptual diagrams illustrating neighboring pixels used to estimate parameters in IC model. The reference block of current CU is found by using current PU's disparity vector.

To estimate parameters a and b for a PU, video encoder 200 and/or video decoder 300 may use two sets of pixels as shown in FIGS. 4A and 4B. In the example of FIG. 4A, the first set of pixels is a set of available reconstructed neighboring pixels in left column and above row of current CU (the CU that contains current PU). FIG. 4B shows a second set of pixels that are corresponding neighboring pixels of current CU's reference block. The reference block of the current CU may be found by using a current PU's disparity vector.

Let $Rec_{neig}$ and $Rec_{refneig}$ denote used neighboring pixel set of the current CU (e.g., neighboring pixels used to determine illumination compensation parameters) and the current CU's reference block respectively, and let 2N denote the pixel number in Rec$_{neig}$ and Rec$_{refneig}$. Then, a and b can be calculated in accordance with the following equations:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (1)$$

$$b = \frac{\sum_{i=0}^{2N-1} Rec_{neig}(i) - a \cdot \sum_{i=0}^{2N-1} Rec_{refneig}(i)}{2N} \quad (2)$$

where Rec$_{neig}$ denotes neighboring samples, where Rec$_{refneig}$ denotes reference neighboring samples, and where N denotes a pixel number in Rec$_{neig}$ and Rec$_{refneig}$.

In some examples, video encoder 200 and/or video decoder 300 may use only the linear model and b is always set equal to 0. In some examples, video encoder 200 and/or video decoder 300 may use only b, and a is always set equal to 1.

In HEVC, Weighted Prediction (WP) is supported, where a scaling factor (denoted by a), a shift number (denoted by s) and an offset (denoted by b) is used in the motion compensation. Suppose the pixel value in position (x, y) of the reference picture be p(x, y), then p'(x, y)=((a*p(x, y)+(1<<(s−1)))>>s)+b instead of p(x, y) is used as the prediction value in motion compensation.

When WP is enabled, for each reference picture of current slice, source device 102 may signal a flag to indicate whether WP applies for the reference picture or not. If WP applies for one reference picture, source device 102 may send a set of WP parameters (i.e., a, s and b) to the decoder and the set of WP parameters are used for motion compensation from the reference picture. To flexibly turn on/off WP for the luma and chroma components, source device 102 may separately signal the WP flag and WP parameters for luma and chroma components. In WP, video encoder 200 and/or video decoder 300 may use one same set of WP parameters for all pixels in one reference picture.

Figures 5A, 5B:
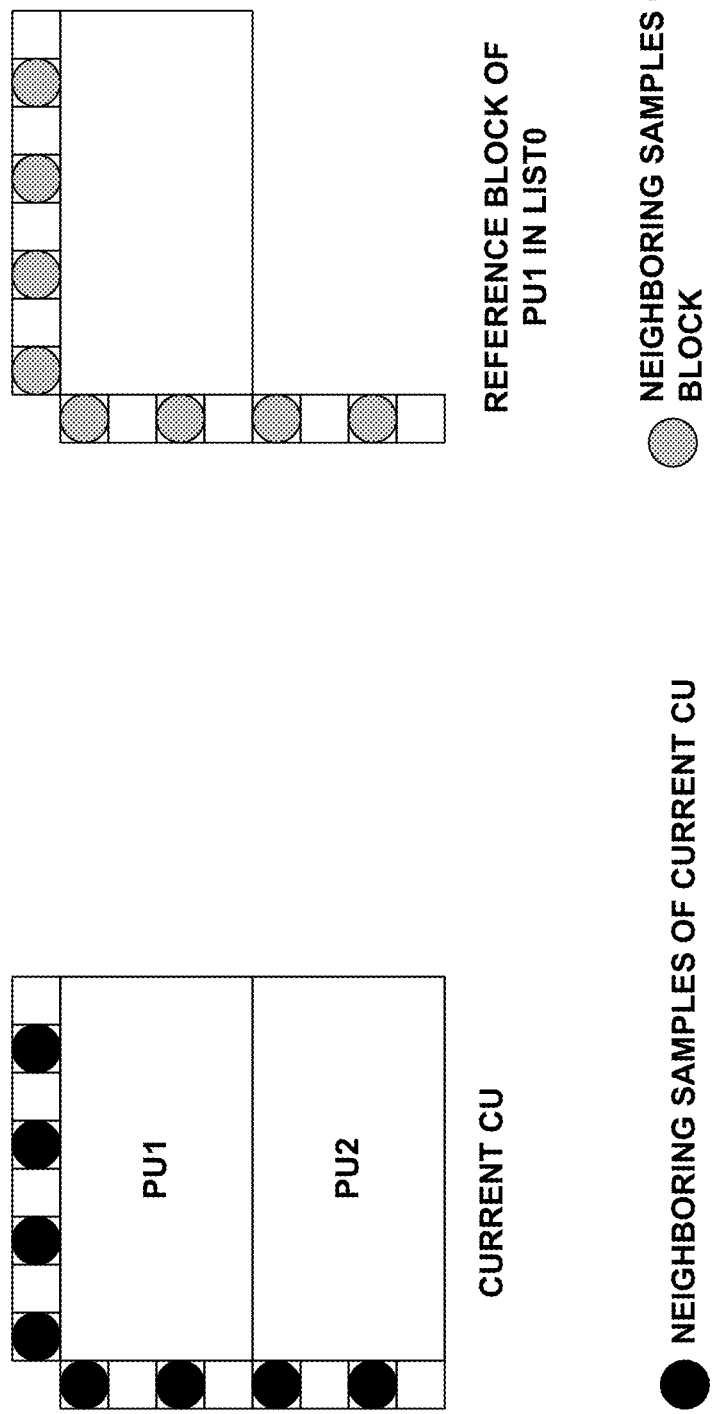
FIGS. 5A and 5B are conceptual diagrams illustrating neighboring samples used for deriving IC parameters.

FIGS. 5A and 5B are conceptual diagrams illustrating neighboring samples used for deriving IC parameters. Local Illumination Compensation (LIC) is based on a linear model for illumination changes, using a scaling factor a and an offset b. Video encoder 200 and/or video decoder 300 may enable or disable LIC adaptively for each inter-mode coded CU. When LIC applies for a CU, video encoder 200 and/or video decoder 300 may employ a least square error method to derive the parameters a and b by using the neighbouring samples of the current CU and their corresponding reference samples. More specifically, in the example of FIG. 5A, video encoder 200 and/or video decoder 300 may use the sub-sampled (2:1 subsampling) neighbouring samples of the CU. Additionally, or alternatively, in the example of FIG. 5B, video encoder 200 and/or video decoder 300 may use corresponding pixels (identified by motion information of the current CU or sub-CU) in the reference picture. For example, video encoder 200 and/or video decoder 300 may derive and apply the IC parameters for each prediction direction separately.

When a CU is coded with merge mode, video encoder 200 and/or video decoder 300 may copy the LIC flag from neighbouring blocks, in a way similar to motion information copy in merge mode; otherwise, video encoder 200 and/or video decoder 300 may signal an LIC flag for the CU to indicate whether LIC applies or not.

Figure 6:
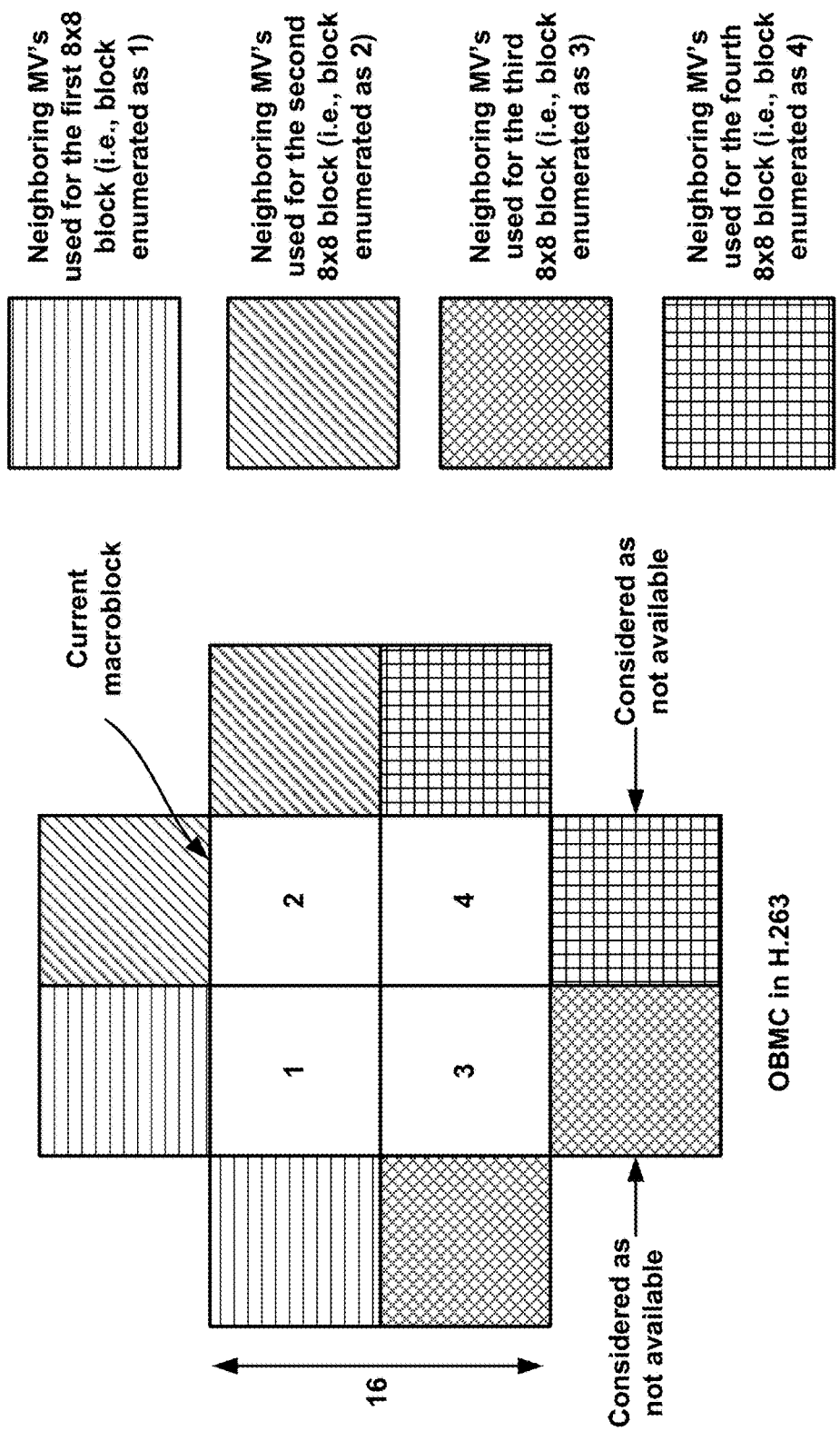
FIG. 6 is a conceptual diagram illustrating how overlapped block motion compensation (OBMC) was implemented in H.263.

OBMC was proposed in the development of H.263, as discussed in Video Coding for Low Bitrate Communication, document Rec. H.263, ITU-T, April 1995 video encoder 200 and/or video decoder 300 may perform OBMC on 8×8 block, and motion vectors of two connected neighboring 8×8 blocks may be used for current block as shown in FIG. 6. For example, for the first 8×8 block in current macroblock, besides its own motion vector, video encoder 200 and/or video decoder 300 may apply the above and left neighboring motion vector to generate two additional prediction blocks. In this way, video encoder 200 and/or video decoder 300 may use each pixel in the current 8×8 block have three prediction values and weighted average of these three prediction values as the final prediction.

FIG. 6 shows an example of how OBMC was implemented in H.263. When a neighboring block is not coded or coded as intra (i.e., the neighboring block does not have an available motion vector), the motion vector of the current 8×8 block is used as the neighboring motion vector. Referring now to the third and fourth 8×8 blocks (e.g., the blocks respectively identified with the numerals "3" and "4" in FIG. 6) of the current macroblock, the below neighboring block is always not used (i.e., considered as not available). In other words, for the current macroblock, no motion information from macroblocks below the current macroblock would be used to reconstruct the pixels of the current macroblock during the OBMC. Rather, for block 3, motion information from a left neighbor may be used for OBMC, and for block 4, motion information from a right neighbor may be used for OBMC but blocks below blocks 3 and 4 are assumed to be not coded, and are not used for OBMC.

Figure 7B:
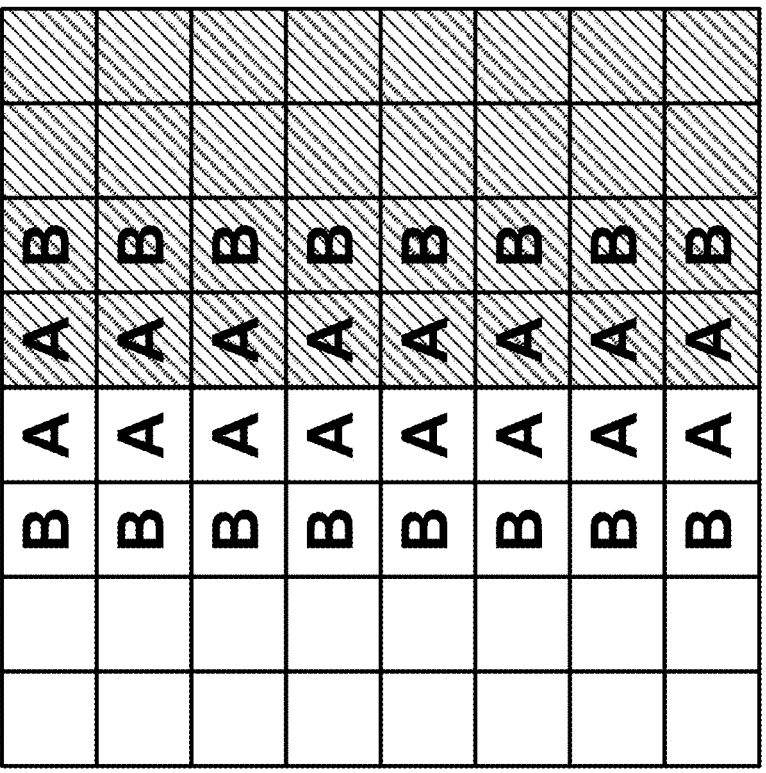
FIGS. 7A and 7B are conceptual diagrams illustrating OBMC in HEVC.
Figure 7A:
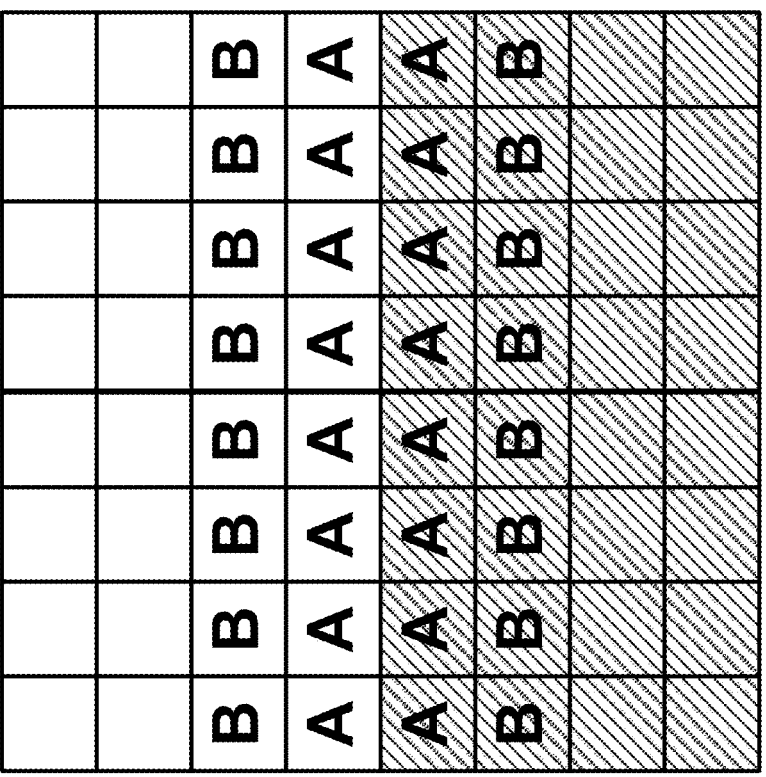
Figure 8B:
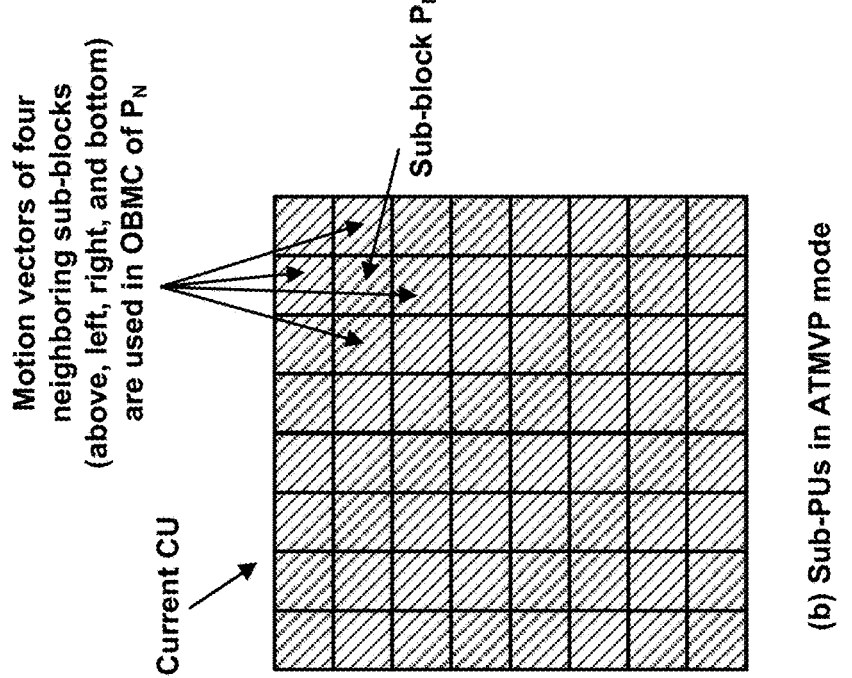
FIG. 8B is a conceptual diagram illustrating sub-PUs in Advanced Temporal Motion Vector Prediction (ATMVP) mode.

FIGS. 7A and 7B are conceptual diagrams illustrating aspects of OBMC according to HEVC. In the development of HEVC, OBMC was proposed to smooth the PU boundary. FIG. 7A shows section 33 and FIG. 8B shows section 35. Sections 33 and 35 each illustrate a CU that includes two PUs. In both section 33 and section 35, the pixels with solid-line boundaries belong to PU0, while the pixels with dashed-line boundaries belong to PU1. If a CU contains two or more PUs, then video encoder 200 and video decoder 300 may use OBMC to smooth lines and/or columns near the PU boundary. For pixels marked with "A" or "B" in PU0 or PU1 of FIGS. 7A and 7B, video encoder 200 and video decoder 300 may generate two prediction values. For instance, video encoder 200 and video decoder 300 may generate the prediction values for the pixels marked "A" or "B" by applying motion vectors of PU0 and PU1 respectively and using the weighted average of the prediction values as the final prediction for the respective pixel.

Figure 8A:
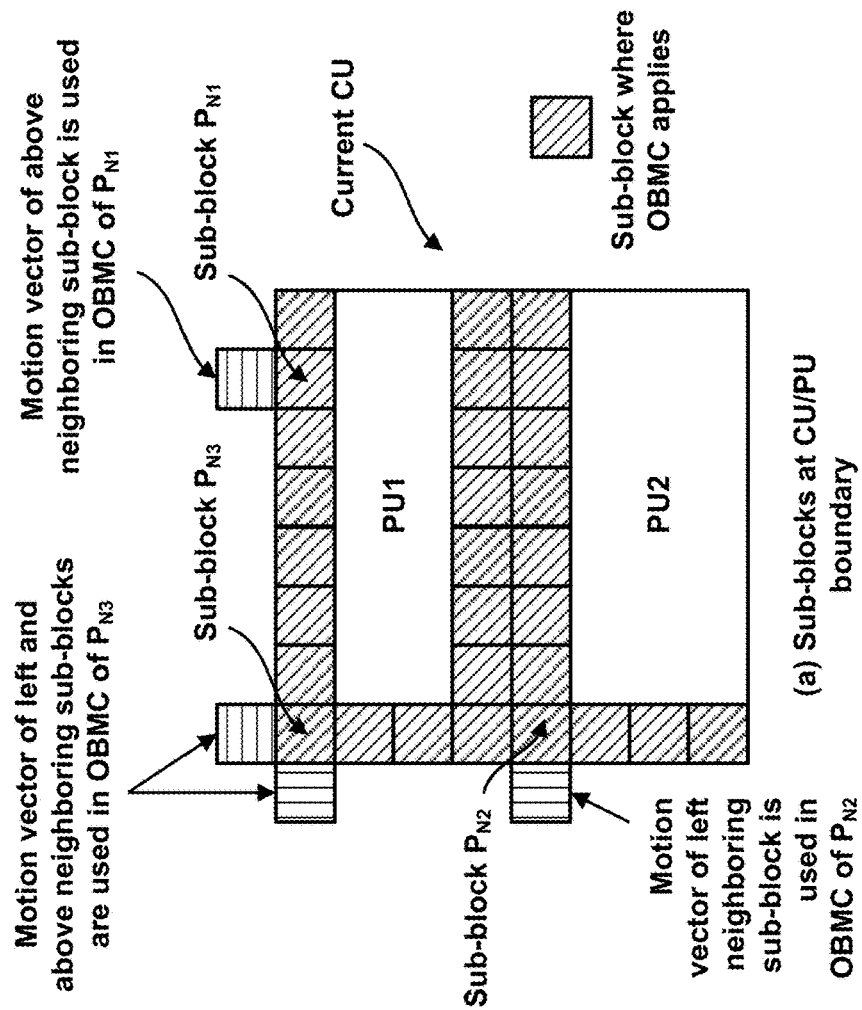
FIG. 8A is a conceptual diagram illustrating sub-blocks where OBMC applies, in accordance with sub-PU level OBMC techniques.

FIG. 8A is a conceptual diagram illustrating sub-blocks where OBMC applies, in accordance with sub-PU level OBMC techniques. FIG. 8B is a conceptual diagram illustrating sub-PUs in ATMVP mode. Sub-PU level OBMC is applied in the current JEM configuration. According to the sub-PU level OBMC of JEM, OBMC is performed for all Motion Compensated (MC) block boundaries except the right and bottom boundaries of a CU. Moreover, according to the sub-PU level OBMC of JEM, video encoder 200 and video decoder 300 may apply OBMC for both luma and chroma components. In HEVC, an MC block corresponds to a PU. In JEM, when a PU is coded with a sub-PU mode, each sub-block of the PU is an MC block. To process CU/PU boundaries in a uniform fashion, video encoder 200 and video decoder 300 may perform OBMC at a sub-block level for all MC block boundaries, with the sub-block size set equal to 4×4, as illustrated in FIG. 8A.

When OBMC applies to the current sub-block, in addition to the current motion vectors, video encoder 200 and video decoder 300 may also use the motion vectors of four connected neighbouring sub-blocks, if available and not identical to the current motion vector, to derive a prediction block for the current sub-block. Video encoder 200 and video decoder 300 may weight the multiple prediction blocks based on multiple motion vectors, to generate the final prediction signal of the current sub-block.

The discussion below denotes a prediction block based on motion vectors of a neighboring sub-block as $P_N$, with N indicating an index for the neighboring above, below, left and right sub-blocks, and denotes the prediction block based on motion vectors of the current sub-block as $P_C$. If $P_N$ belongs to the same PU as $P_C$ (and thus contains the same motion information), video encoder 200 and video decoder 300 do not perform the OBMC from $P_N$. Otherwise, video encoder 200 and video decoder 300 may add every pixel of $P_N$ to the same pixel in $P_C$. That is, if $P_N$ does not belong to the same PU as $P_C$, four rows/columns of $P_N$ are added to $P_C$.

Video encoder 200 and video decoder 300 may use the weighting factors {1/4, 1/8, 1/16, 1/32} for $P_N$ and may use the weighting factors {3/4, 7/8, 15/16, 31/32} for $P_C$. The exceptions are small MC blocks, (e.g., when PU size is equal to 8×4, 4×8 or a PU is coded with Advanced Temporal Motion Vector Prediction (ATMVP) mode), for which video encoder 200 and video decoder 300 may add only two rows/columns of $P_N$ to $P_C$. In these cases, video encoder 200 and video decoder 300 may use weighting factors {1/4, 1/8} for $P_N$ and may use weighting factors {3/4, 7/8} for $P_C$. For a $P_N$ generated based on motion vectors of vertically neighboring sub-block(s), video encoder 200 and video decoder 300 may add pixels in the same row of $P_N$ to $P_C$ with a same weighting factor. For a $P_N$ generated based on motion vectors of horizontally neighboring sub-block(s), video encoder 200 and video decoder 300 may add pixels in the same column of $P_N$ to $P_C$ with a same weighting factor.

For PU boundaries, video encoder 200 and video decoder 300 may apply OBMC on each side of the boundary. As shown in FIG. 8A, OBMC can be applied along the boundary between PU1 and PU2 twice. First, OBMC is applied with PU2's MV to the dashed-line-bordered blocks along the boundary inside PU1. Second, OBMC is applied with the PU1's MV to the dashed-line-bordered blocks along the boundary inside PU2. In contrast, OBMC is applied to one side of CU boundaries, because when coding the current CU, the already-coded CUs cannot be changed.

Frame rate up-conversion (FRUC). FRUC technology may be used to generate high-frame-rate videos based on low-frame-rate videos. FRUC has been used in display industry. Examples include, for example, X. Chen, J. An, J. Zheng, "EE3: Decoder-Side Motion Vector Refinement Based on Bilateral Template Matching," JVET-E0052, January 2017, W. H. Lee, K. Choi, J. B. Ra, "Frame rate up conversion based on variational image fusion", IEEE transactions on image processing, vol. 23, No. 1, January 2014, and U. S. Kim, M. H. Sunwoo, "New frame rate up-conversion algorithms with low computational complexity", IEEE transactions on circuits and systems for video technology, vol. 24, No. 3, March 2014.

FRUC algorithms may be divided into two types. One type of methods interpolate intermediate frames by simple frame repetition or averaging. However, this method provides improper results in a picture that contains a lot of motion. The other type of technique, called motion-compensated FRUC (MC-FRUC), considers object movement when MC-FRUC generates intermediate frames and consists of two steps: motion estimation (ME) and motion-compensated interpolation (MCI). ME generates motion vectors (MVs), which represent object motion using vectors, whereas MCI uses MVs to generate intermediate frames.

The block-matching algorithm (BMA) is widely used for ME in MC-FRUC as MC-FRUC is simple to implement. BMA divides an image into blocks and detects the movement of those blocks, e.g., to determine whether the blocks correspond. Two kinds of ME are primarily used for BMA: unilateral ME and bilateral ME.

Figure 9:
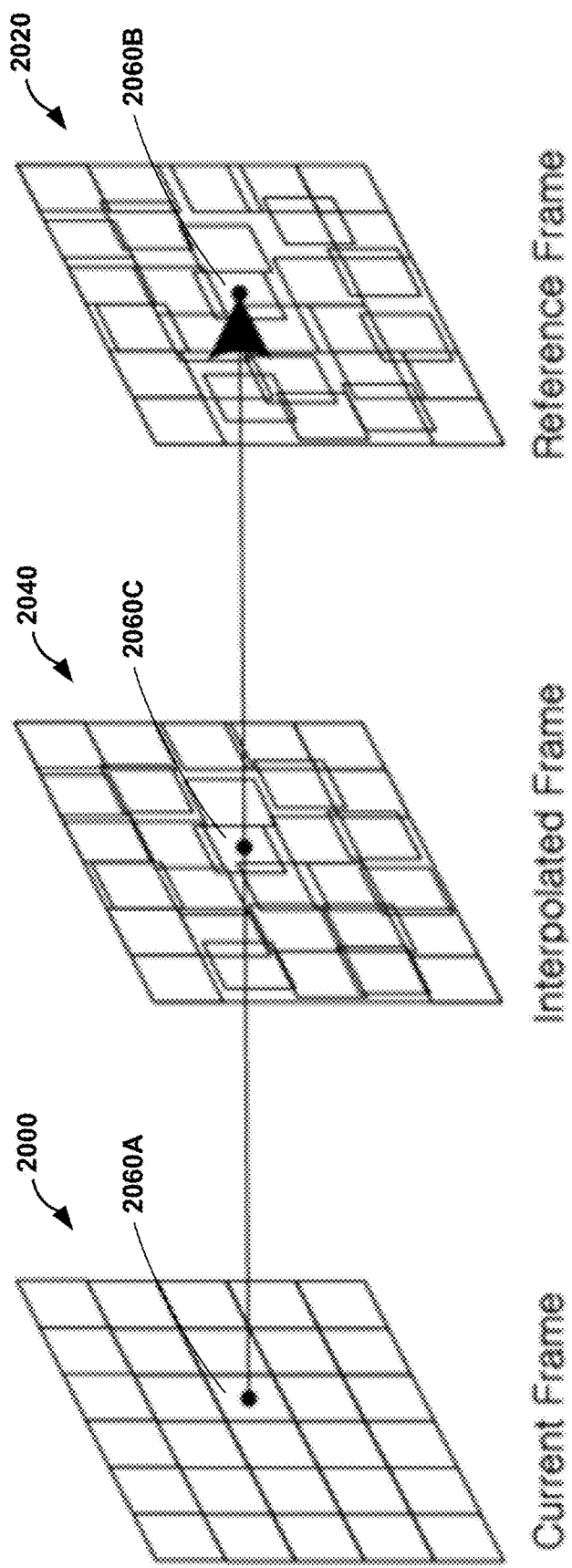
FIG. 9 is a conceptual diagram illustrating unilateral motion estimation in Frame rate up-conversion (FRUC).

As shown in FIG. 9, unilateral ME obtains MVs by searching the best matching block from reference frame 2020 of current frame 2000. Then the block on the motion trajectory in the interpolated frame can be located so that the MV is achieved. As shown in FIG. 9, three blocks including 2060A, 2060B, and 2060C from current frame 2000, reference frame 2020 and interpolated frame 2040, respectively, are involved following the motion trajectory. Although block 2060A in current frame 2000 belongs to a coded block, the best matching block 2060B in reference frame 2020 may not fully belong to a coded block, and neither does block 2060C in interpolated frame 2040. Consequently, overlapped regions of the blocks and un-filled (holes) regions may occur in the interpolated frame.

To handle overlaps, simple FRUC algorithms merely involve averaging and overwriting the overlapped pixels. Moreover, holes are covered by the pixel values from a reference or a current frame. However, these algorithms result in blocking artifacts and blurring. Hence, motion field segmentation, successive extrapolation using the discrete Hartley transform, and image inpainting are proposed to handle holes and overlaps without increasing blocking artifacts and blurring.

Figure 10:
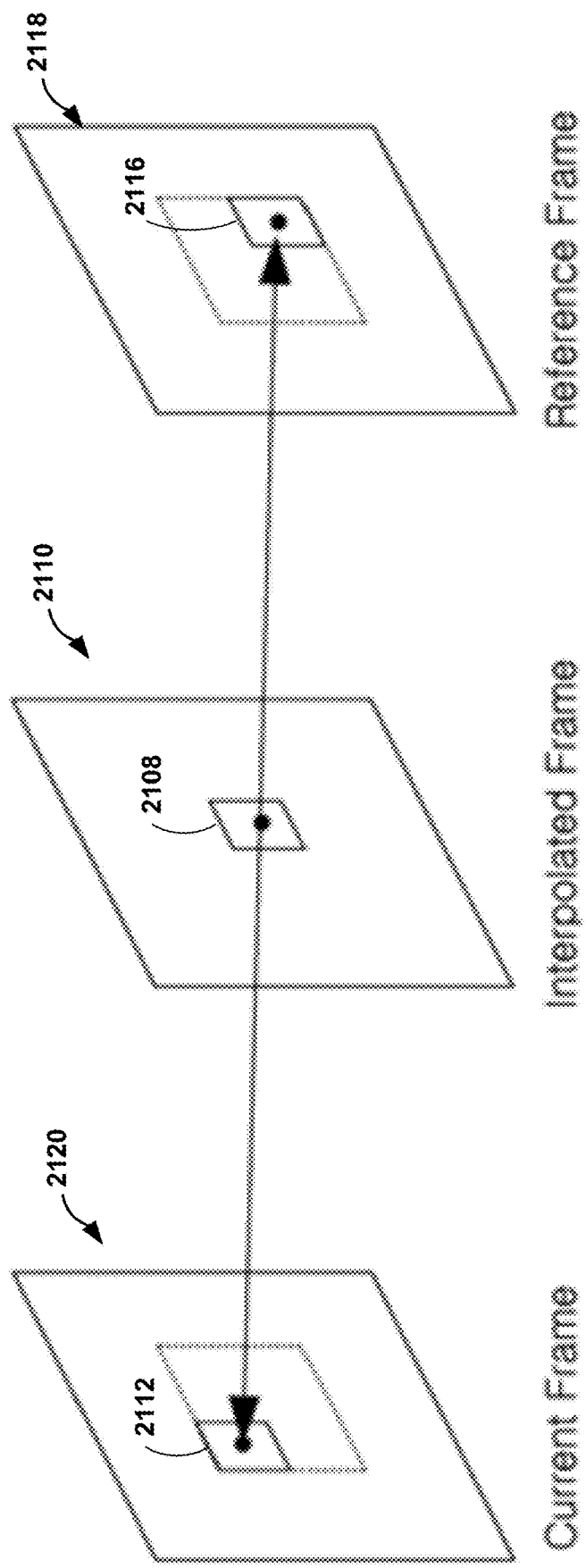
FIG. 10 is a conceptual diagram illustrating an example of bilateral motion estimation (ME) in FRUC.

FIG. 10 is a conceptual diagram illustrating an example of bilateral motion estimation (ME) in FRUC. In particular, FIG. 10 illustrates an interpolated block 2108 of an interpolated frame 2110 that is interpolated from a current block 2112 of a current frame 2114 and a reference block 2116 of a reference frame 2118. As shown in FIG. 10, bilateral ME is another solution (in MC-FRUC) that can be used to avoid the problems caused by overlaps and holes shown in FIG. 5. Bilateral ME obtains MVs passing through interpolated block 2108 using the temporal symmetry between blocks 2112 and 2116 of current frame 2114 and reference frame 2118, respectively. As a result, bilateral ME does not generate overlaps and holes. Since bilateral ME assumes the current block is a block that is being processed, in a certain order, e.g., as in the case of video coding, a sequence of such blocks would cover the whole intermediate picture without overlap. For example, in the case of video coding, blocks can be processed in the decoding order. Therefore, such a method may be more suitable if FRUC ideas can be considered in a video coding framework.

Figure 11:
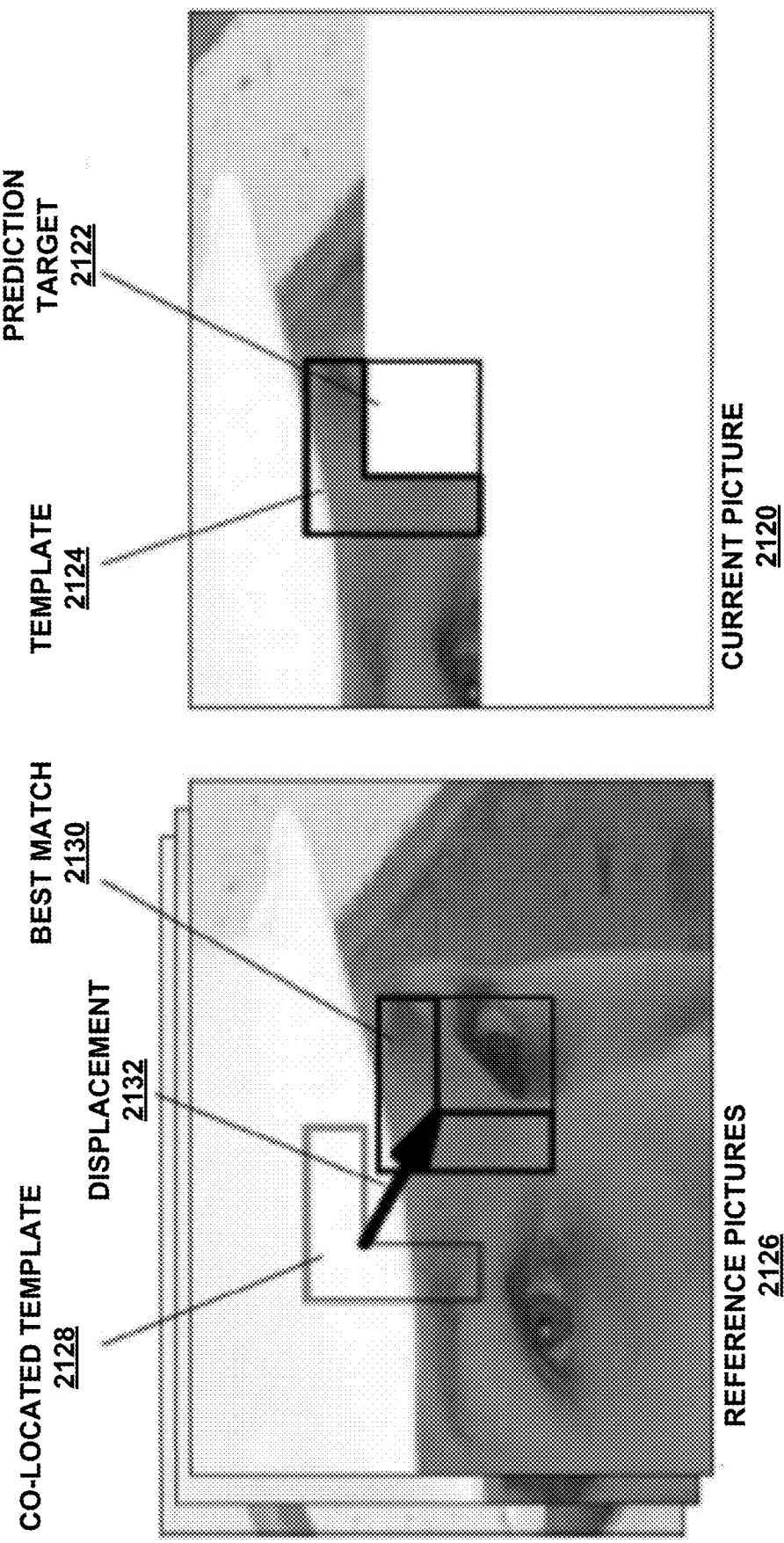
FIG. 11 is a conceptual diagram illustrating an example of template matching based decoder side motion vector derivation (DMVD).

FIG. 11 is a conceptual diagram illustrating an example of template matching based decoder side motion vector derivation (DMVD). With advanced video codecs, the bit percentage of motion information in bitstream becomes more and more. In some instances, DMVD may reduce the bit cost of motion information. Template matching based DMVD may exhibit a coding efficiency improvement, as described, for example, in S. Kamp, M. Wien, "Decoder-side motion vector derivation for block-based video coding", IEEE transactions on circuits and systems for video technology, vol. 22, No. 12, December 2012.

In the example of FIG. 11, a current picture 2120 includes a prediction target 2122 (e.g., a block currently being coded) and a template 2124. Reference pictures 2126 include a co-located template 2128, a best match 2130, and a displacement vector 2132. A video coder (such as video encoder 200 and/or video decoder 300) may use template 2124 to search for a best match for prediction target 2122 (e.g., rather than using the prediction target 2122 itself, which is yet to be coded). For example, the video coder may perform a motion search to identify a first set of reference data (e.g., best match 2130) that corresponds to a second set of reference data outside of prediction target 2122 (e.g., template 2124). As noted above, correspondence may be determined based on an amount of similarity between reference data and may be referred to herein as determining a "match" or "best match."

In the example shown, the video coder may identify co-located template 2128 in reference pictures 2126. The video coder may then search for best match 2130, which includes pixel values that are similar to template 2124. The video coder may determine displacement vector 2132 based on the displacement of co-located template 2128 and best match 2130 in reference pictures 2126.

Assuming template 2124 and prediction target 2122 are from the same object, the motion vector of the template can be used as the motion vector of the prediction target. Hence, in the example of FIG. 11, the video coder may apply displacement vector 2132 to prediction target 2122. Since the template matching is conducted at both a video encoder and a video decoder, the motion vector can be derived at decoder side to avoid signaling cost.

Figure 12:
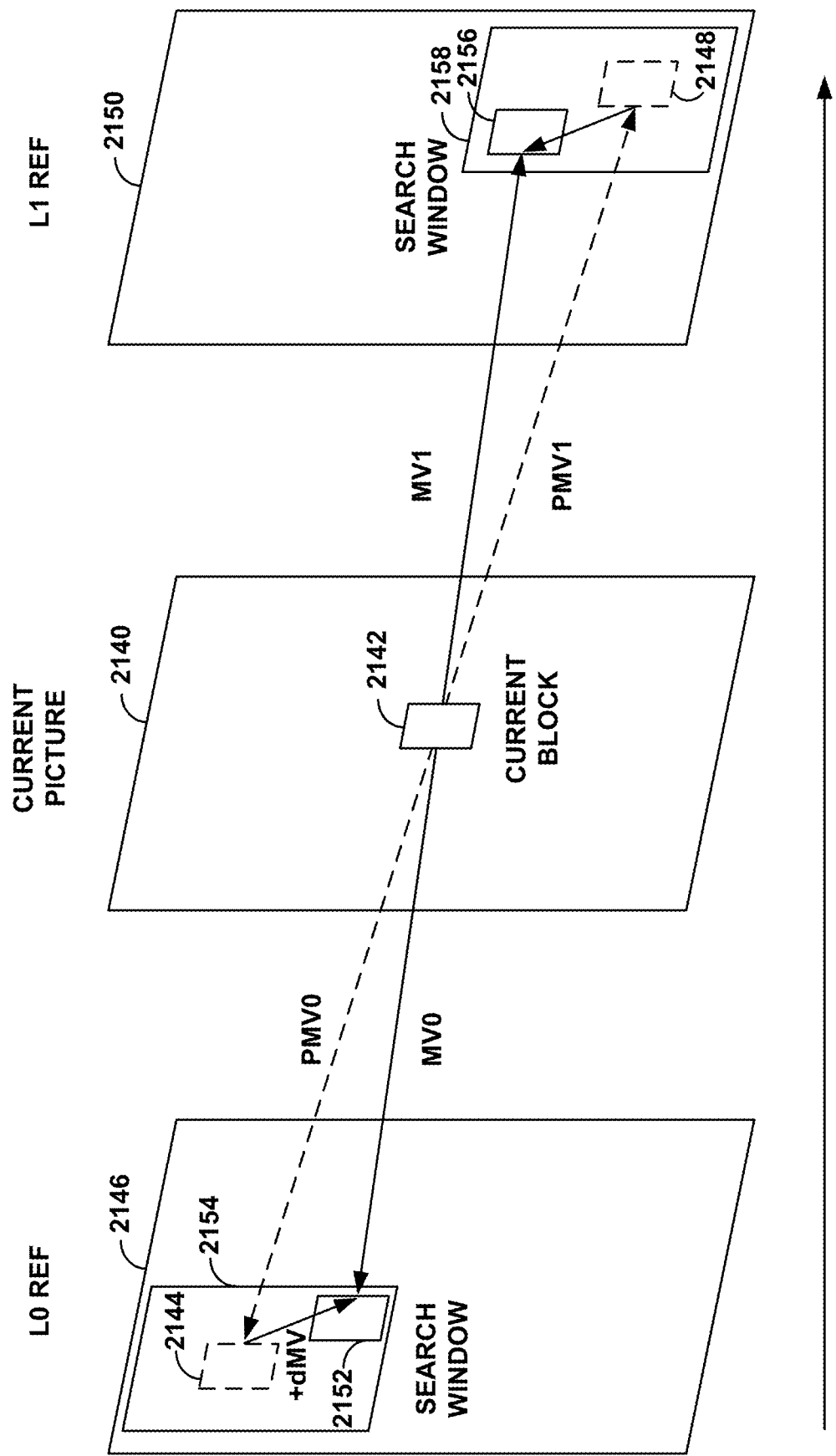
FIG. 12 is a conceptual diagram illustrating an example of bidirectional motion vector derivation in DMVD.

FIG. 12 is a conceptual diagram illustrating an example of bidirectional motion vector derivation in DMVD. Another category of DMVD is mirror based bidirectional MV derivation, as described, for example, in Y.-J. Chiu, L. Xu, W. Zhang, H. Jiang, "Decoder-side Motion Estimation and Wiener filter for HEVC", Visual communications and Image Processing (VCIP), 2013. The concept of bidirectional motion vector derivation in DMVD may be akin to bilateral ME in FRUC. For example, mirror-based MV derivation may be applied by centro-symmetric motion estimation around search centers in fractional sample accuracy.

The example of FIG. 12 includes current picture 2140 having current block 2142 (the block currently being coded), a first candidate motion vector PMV0 that identifies a first template block 2144 of a first reference picture 2146 (L0 ref), and a second candidate motion vector PMV1 that identifies a second template block 2148 of a second reference picture 2150. The video coder may apply dMV as an offset to locate a first reference block 2152 in search window 2154 of first reference picture 2146 and to locate a second reference block 2156 in search window 2158 of second reference picture 2150.

For example, the video coder may add dMV to PMV0 and subtract dMV from PMV1 to generate an MV pair, MV0 and MV1. The video coder may check all values of dMV inside search window 2154 and 2158 to determine which value of dMV results in the best match between first reference block 2152 (e.g., a first set of reference data) of L0 ref and second reference block 2156 (e.g., a second set of reference data) of L1 ref. In some examples, the video coder may determine the best match based on the Sum of Absolute Difference (SAD). In other examples, the video coder may use another metric to determine the best match. The size and location of search windows 2154 and 2158 may be pre-defined or may be signaled in a bitstream.

The video coder may select the MV pair with the minimum SAD as the output of Centro-symmetric motion estimation. Since this technique uses a future reference (reference at a temporal position later than the current frame) and an earlier reference (reference at a temporal position earlier than the current frame) for the SAD matching, selecting the MV pair with the minimum SAD cannot be applied to P frame or low-delay B frames in which only former reference is available.

Figure 13:
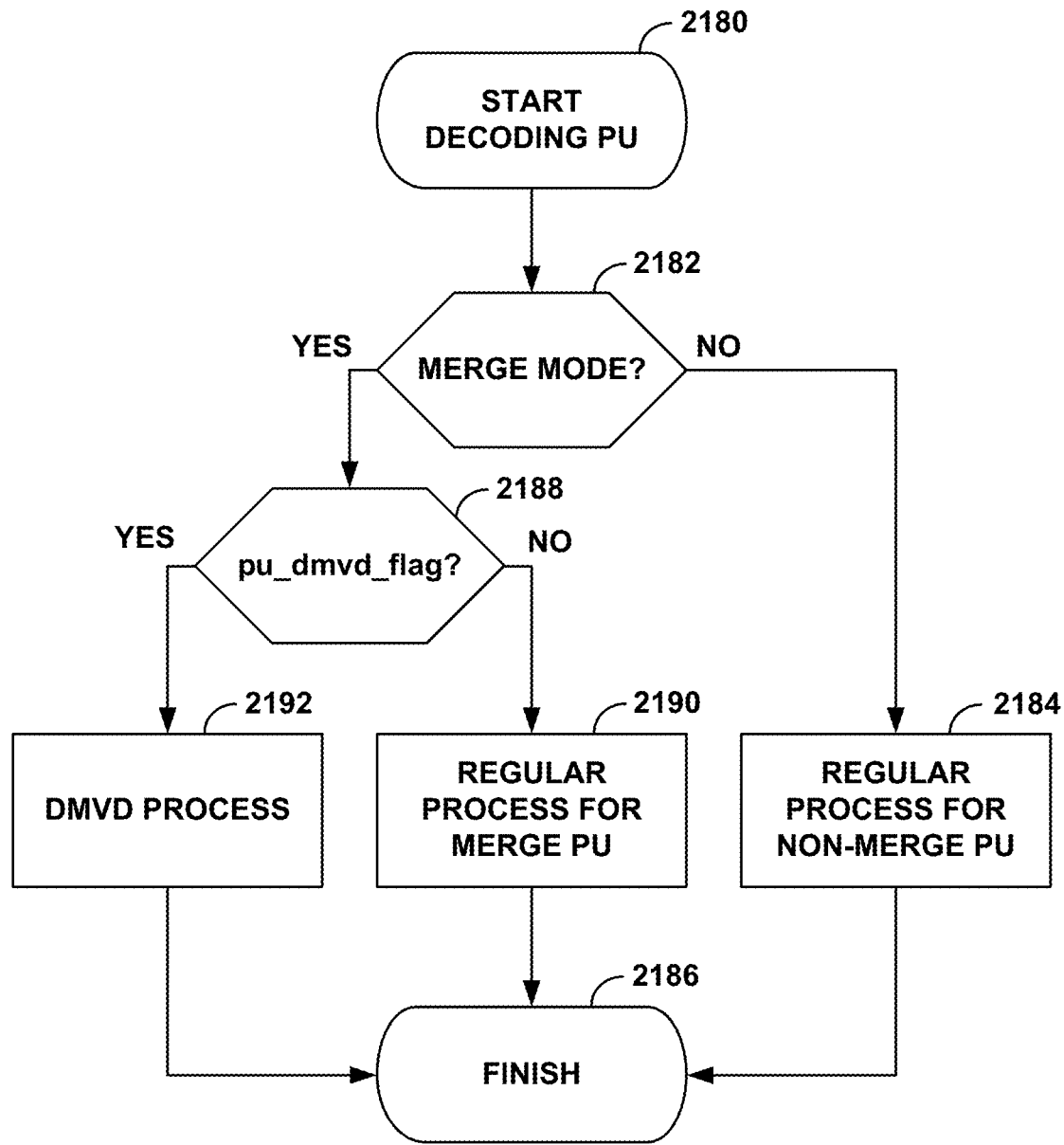
FIG. 13 is a flowchart illustrating an example of decoding a prediction unit (PU) using DMVD.

FIG. 13 is a flowchart illustrating an example of decoding a prediction unit (PU) using DMVD. In Y.-J. Chiu, L. Xu, W. Zhang, H. Jiang, "Decoder-side Motion Estimation and Wiener filter for HEVC", Visual communications and Image Processing (VCIP), 2013, it was further proposed to combine the mirror based bidirectional MV derivation with merge mode in HEVC. In the proposed technique, a flag called pu_dmvd_flag is added for a PU of B slices to indicate if a DMVD mode is applied to the current PU. Because the DMVD mode does not explicitly transmit any MV information in the bitstream, the pu_dmvd_flag syntax element is integrated with the syntax of merge mode in HEVC (which uses an index for data representative of a motion vector rather than the motion vector itself).

In the example of FIG. 13, a video decoder (such as video decoder 30) may start decoding a PU (2180). Video decoder 300 may determine whether the mode used to decode the PU is merge mode (2182), e.g., based on syntax included in a bitstream that includes the PU. If merge mode is not used (the "no" branch of step 2182), video decoder 300 may use a regular process for a non-merge PU to decode the PU (2184) and finish the process (2186).

If the merge mode is used (the "yes" branch of step 2182), video decoder 300 may determine whether DMVD is used to determine motion information for the PU based on the value of the pu_dmvd_flag syntax element (2188). If DMVD is not used (the "no" branch of step 2188), video decoder 300 may use a regular merge mode to decode the PU (2190) and finish the process (2186). If DMVD is used (the "yes" branch of step 2188), video decoder 300 may apply a DMVD process to determine the motion information for the PU (2192) and finish the process (2186).

Modification of merge candidate derivation. Two additional merge candidates were introduced to improve the coding performance. The PUs are split into square N×N sub-PUs (e.g. N is set to 4). The motion vectors of the sub-PUs are derived recursively, following raster scan order.

Advanced temporal motion vector predictor. Advanced temporal motion vector prediction (ATMVP) was proposed to allow each PU to obtain multiple sets of motion information (including motion vectors and reference frames). The motion information in ATMVP comes though only from the reference pictures. To derive ATMVP of the current PU, a first step is determining where the temporal motion vectors to be fetched. The video coder finds the first available motion vector in five neighboring blocks in the order or Left, Above, Above-right, Left-bottom, and Above-left. The definition of the five neighboring blocks is the same as spatial merge candidates of the current PU. To avoid the repetitive scanning process of neighboring blocks, the video coder may only find the motion vector of the first merge candidate in the already-derived merge candidate list to determine where to fetch the temporal motion vector. The PUs are split into square N×N sub-PUs (e.g., N is set to 4). The motion vectors of the sub-PUs are derived recursively, following raster scan order.

Figure 14:
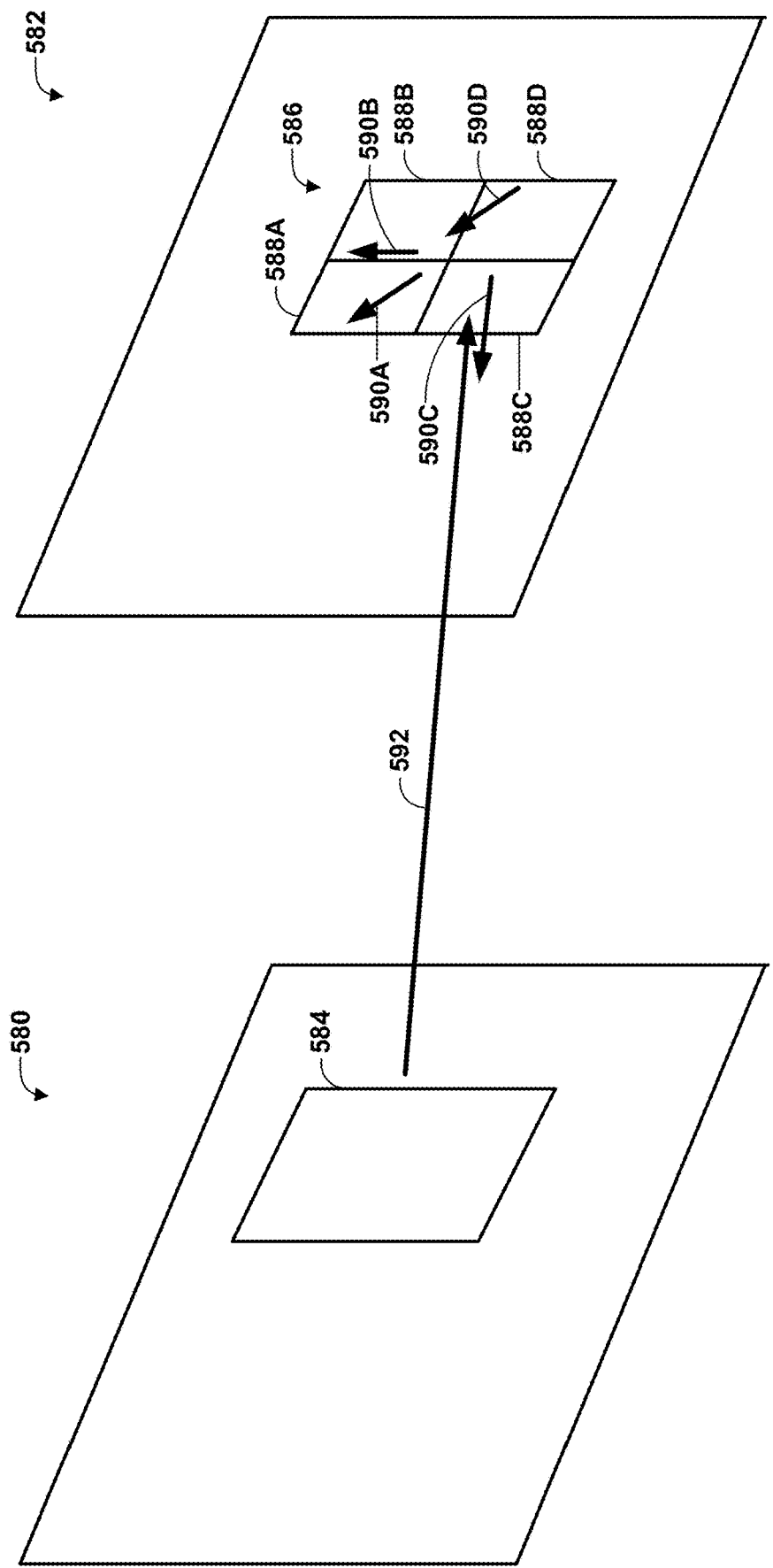
FIG. 14 is a conceptual diagram illustrating sub-PU motion prediction from a reference picture.

FIG. 14 is a conceptual diagram illustrating sub-PU motion prediction from a reference picture. In this example, current picture 580 includes a current PU 584 (e.g., a PU). In this example, motion vector 592 identifies PU 586 of reference picture 582 relative to PU 584. PU 586 is partitioned into sub-PUs 588A-588D, each having respective motion vectors 590A-590D. Thus, although current PU 584 is not actually partitioned into separate sub-PUs, in this example, current PU 584 may be predicted using motion information from sub-PUs 588A-588D. In particular, a video coder may code sub-PUs of current PU 584 using respective motion vectors 590A-590D. However, the video coder need not code syntax elements indicating that current PU 584 is split into sub-PUs. In this manner, current PU 584 may be effectively predicted using multiple motion vectors 590A-590D, inherited from respective sub-PUs 588A-588D, without the signaling overhead of syntax elements used to split current PU 584 into multiple sub-PUs.

Spatio-temporal motion vector predictor. The spatio-temporal motion vector predictor (SPMVP) considers as candidates not only the temporal motion vector predictors but also the spatial motion vector predictors. By averaging motion information of two spatial motion vector predictor and one temporal motion vector predictor, an additional merge candidate is generated for each sub-PU to achieve further BD rate reduction.

Figure 15B:
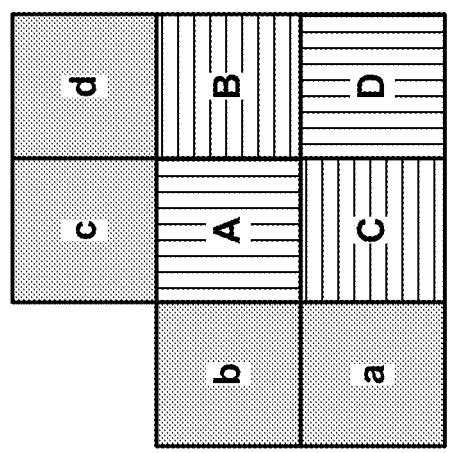
FIGS. 15A and 15B are conceptual diagrams illustrating an example derivation of spatio-temporal motion vector predictors.
Figure 15A:
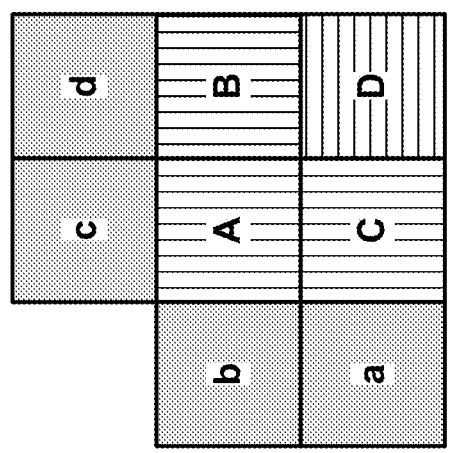

For the derivation of SPMVP, two spatial neighbors and one temporal motion predictor were used to derive the motion vectors in each sub-PU. FIGS. 15A and 15B are conceptual diagrams illustrating an example derivation of spatio-temporal motion vector predictors. As shown in FIG. 15A, the PUs are split into square N×N sub-PUs (e.g., N is set to 4). The motion vectors of the sub-PUs are derived recursively, in a raster scan order. Consider an 8×8 PU which contains four 4×4 sub-PUs A, B, C, and D. The neighboring N×N blocks in the current frame are labeled as a, b, c, and d. To derive the motion of sub-PU A, two spatial neighbors (b and c) and one temporal motion predictor (D) are used. The proposed derivation for SPMVP is shown in FIG. 15B. The proposed mothed uses two spatial neighbors (b and c) and two temporal motion predictors (B and C) to derive the motion of sub-PU A.

Merge candidate list generation. As shown in FIG. 2A, the order may be the following: left (0), above (1), above right (2), below left (3). Check ATMVP candidate. Check STMVP candidate. If one of the ATMVP or STMVP candidates is unavailable, check above left (4). Then, check the temporal candidate as shown in FIG. 3B, check the bottom-right at first, if not available, check the center block. If the list size <7, add additional candidates to fix the list size equal to 7.

CBF of a coding block. In VVC, CBF (Coded Block Flag) indicates whether encoded transform information is available for a coding block. The flag cu_cbf specifies that the transform_tree( ) syntax structure is present for the current coding unit. The flags tu_cbf_luma, tu_cbf_cb, tu_cbf_cr specifies that whether the block contains one or more transform coefficient levels not equal to 0 for the corresponding component (Y, Cb, Cr, etc.).

The above techniques may present one or more problems. As one example, for LIC, it is not true that in all circumstances applying LIC can be helpful, so for the conditions that LIC has a low chance of being helpful, disabling the LIC usage without the need of explicitly signaling such information can improve the overall coding performance. As another example, when LIC mode is used, neighboring information is used to derive LIC parameters, which introduces dependency between the current pixels and neighboring pixels. This dependency may sacrifice the capability of parallel processing, which may not be desirable.

This disclosure proposes several techniques that may solve the above, or other, problems. These techniques may be used independently or may be combined in any combination.

In accordance with one or more techniques of this disclosure, a video coder (e.g., video encoder 200 and/or video decoder 300) may selectively include neighboring samples of a current block in a sub-set of a plurality of neighboring samples used to derive LIC parameters for a current block in a current picture. For instance, the video coder may include neighboring samples that are available at the time the current block is being processed in the sub-set, while excluding samples that are not available at the time the current block is being processed from the sub-set. As discussed above with reference to FIG. 4A, the plurality of neighboring samples in the current picture (e.g., $Rec_{neig}$) may include a row of samples adjacent to a top row of the current block in the current picture and a column of samples adjacent to a left column of the current block in the current picture.

The video coder may analyze the plurality of neighboring samples in the current picture to determine which samples to include in the sub-set of neighboring samples in the current picture from-which the LIC parameters are derived. As one example, the video coder may exclude (i.e., not include), from the sub-set of neighboring samples, samples in the row of samples adjacent to the top row of the current block that are reconstructed based on other samples in the current picture. As another example, the video coder may exclude, from the sub-set of neighboring samples, samples in the column of samples adjacent to the left column of the current block that are reconstructed based on other samples in the current picture.

In some examples, the video coder may determine whether a particular sample is reconstructed based on other samples in the current picture based on whether the particular sample is reconstructed based on samples of the current picture located outside of a block that includes the particular sample. As one example, where the particular sample is reconstructed based on samples of the current picture located outside of the block that includes the particular sample, the video coder may determine that the particular sample is reconstructed based on other samples in the current picture. As another example, where the particular sample is not reconstructed based on samples of the current picture located outside of the block that includes the particular sample, the video coder may determine that the particular sample is not reconstructed based on other samples in the current picture.

In some examples, the video coder may determine whether the particular sample is reconstructed based on samples of the current picture located outside of the block that includes the particular sample based on a coding mode of the block that includes the particular sample. As one example, where the block that includes the particular sample is coded with intra mode, the video coder may determine that the particular sample is reconstructed based on samples of the current picture located outside of the block that includes the particular sample. As another example, where the block that includes the particular sample is coded with any of a plurality of specified prediction modes, the video coder may determine that the particular sample is reconstructed based on samples of the current picture located outside of the block that includes the particular sample. Example prediction modes that may be included in the specified prediction modes include, but are not limited to, intra mode, combined intra and inter prediction (CIIP) mode, and current picture referencing (CPR) mode. In some examples, the modes that are included in the specified prediction modes may be pre-determined regardless of the video data being coded. In other examples, the video coder may signal (e.g., encode or decode) which modes are included in the specified prediction modes. For instance, the video coder may code, in or from a video bitstream, one or more syntax elements that indicate the plurality of specified prediction modes.

As described above, the video coder may determine whether certain reconstructed pixels can be used for LIC parameter derivation based on other information available in the bit-stream (i.e., based on something other than an express signaling of which samples are to be included in the sub-set). For instance, the video coder may determine whether certain reconstructed pixels can be used for LIC parameter derivation based on, as a few examples, whether the reconstructed samples are from a skip coded block, whether the reconstructed samples are from an intra coded block or a partially intra coded block. As one example, if the reconstructed sample(s) under consideration is(are) from a block coded with intra mode, the video coder may determine that the sample(s) cannot be used for LIC parameter derivation (i.e., are to be excluded from the sub-set). As another example, if the reconstructed sample(s) under consideration is(are) from a block coded by any type of prediction mode that neighboring sample(s) of the current frame is(are) involved for sample reconstruction of that block (examples of such modes include but not limited to: combined intra and inter prediction (CIIP), current picture referencing (CPR), etc.), the video coder may determine that the sample(s) cannot be used for LIC parameter derivation (i.e., are to be excluded from the sub-set). As another example, if the reconstructed sample(s) under consideration is(are) from a block coded by a mode that in a pre-selected set of coding modes (e.g., a set of three modes: [IntraMode, CIIP Mode, CPR Mode]), the video coder may determine that the sample(s) cannot be used for LIC parameter derivation. As described above, the set of modes can be pre-defined or signaled in the bit-stream.

The video coder may derive the LIC parameters based on the sub-set of neighboring samples of the current block and one or more neighboring samples of a reference block in a reference picture. For instance, where the sub-set of neighboring samples of the current block are $Rec_{neig}$ and the one or more neighboring samples of the reference block in the reference picture are $Rec_{refneig}$, the video coder may determine parameters a and b in accordance with Eq. (2) above.

In some examples, the video coder may adjust which samples of the neighboring samples of the reference block are used to derive the LIC parameters. For instance, the video coder may select a sub-set of a plurality of neighboring samples of the reference block in the reference picture. As discussed above, the one or more neighboring samples of the reference block in the reference picture may include a row of samples adjacent to a top row of the reference block in the reference picture and a column of samples adjacent to a left column of the reference block in the reference picture. Further details of which samples of the neighboring samples of the reference block are used to derive the LIC parameters are discussed below with reference to FIG. 16.

The video coder may perform LIC based on the derived LIC parameters. For instance, the video coder may process samples of the current block in accordance with Eq. (1) above to generate an illumination compensated version of the current block.

FIG. 16 is a conceptual diagram illustrating selective inclusion of neighboring samples of a reference block in a set of samples on which LIC parameters are derived, in accordance with one or more techniques of this disclosure. As discussed above, video coder may adjust which samples of the neighboring samples of the reference block are used to derive the LIC parameters. For instance, the video coder may determine whether certain reconstructed pixels can be used for LIC parameter derivation based on the availability of other pixels that may be used for LIC parameter derivation. For example, the video coder may exclude, from the sub-set of neighboring samples of the reference block, samples of the plurality of neighboring samples of the reference block located at relative positions corresponding to samples of the plurality of neighboring samples of the current block that are excluded from the sub-set of neighboring samples of the current block.

As one example, a sample in the reference picture can be excluded from LIC parameter derivation if the sample in the current picture with the same relative position to the current block is excluded from parameter derivation. The exclusion of the sample in the current picture can be performed by any method, including but not limited to the technique described above. As an explanation of the 'same relative position' used in the example, for a pixel in the current picture, 'relative position' means the position relative to the current block, for a pixel in the reference picture, 'relative position' means the position relative to the reference block of the current block. As shown in FIG. 16, the neighboring pixel reference block of the current block marked by the bold 'Y' has same relative position as the neighboring pixel of the current block marked by the bold 'X'. In the example mentioned in this paragraph, if the sample marked by bold 'X' is excluded from LIC parameter derivation, then the sample marked by the bold 'Y' may also be excluded from LIC parameter derivation. By excluding corresponding samples from the plurality of neighboring samples of the reference block, the video coder may maintain balance between the two sets of neighboring samples.

Figure 17A:
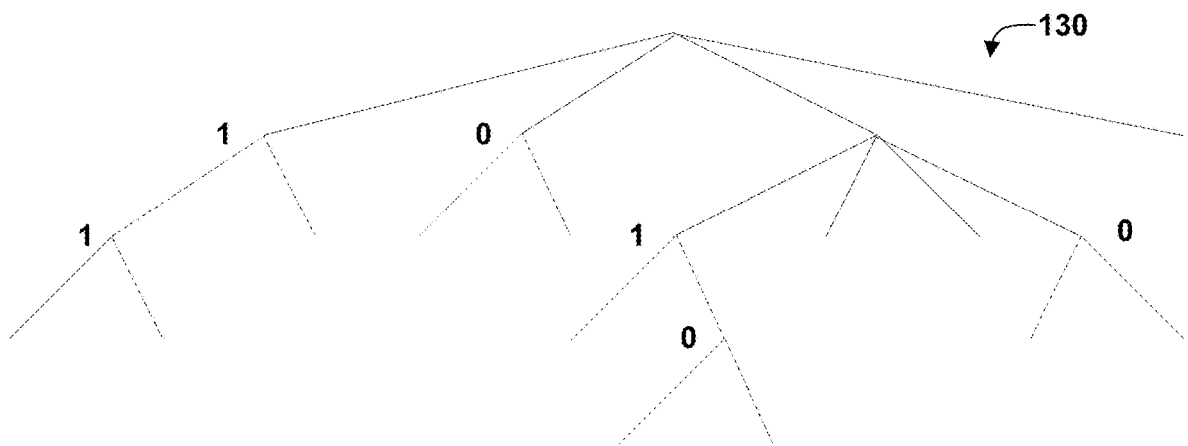
FIGS. 17A and 17B are conceptual diagrams illustrating an example quadtree binary tree (QTBT) structure, and a corresponding coding tree unit (CTU).
Figure 17B:
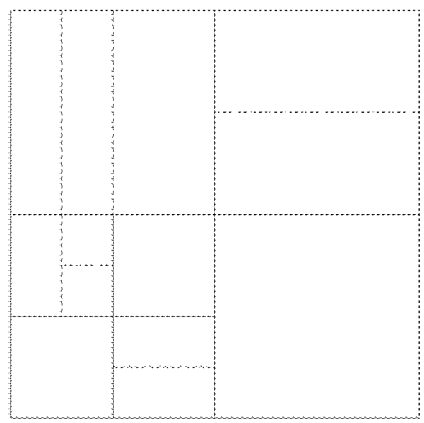

FIGS. 17A and 17B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 17B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 18:
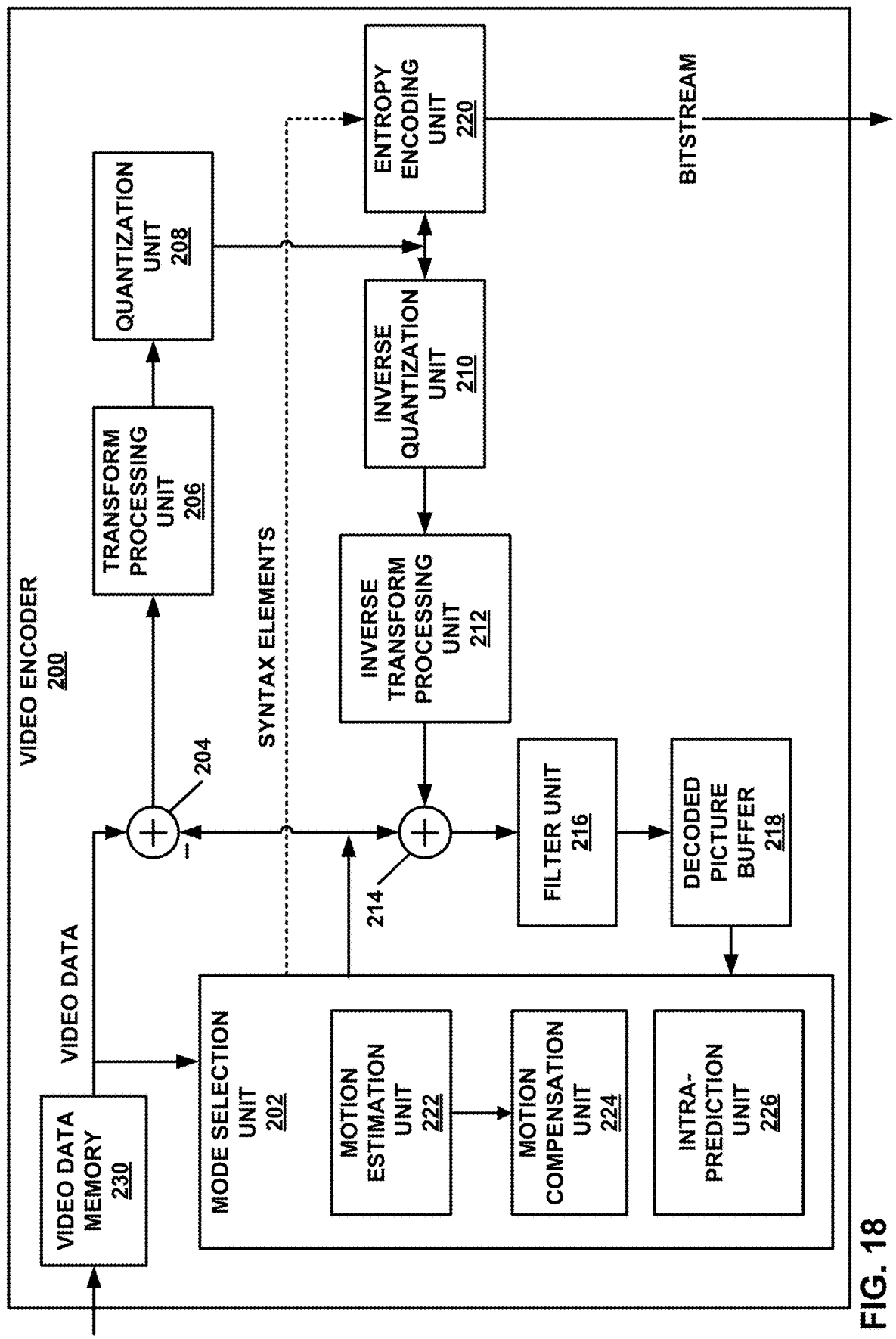
FIG. 18 is a block diagram illustrating an example video encoder that may perform the techniques of this disclosure.

FIG. 18 is a block diagram illustrating an example video encoder 200 that may perform the techniques of this disclosure. FIG. 18 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 18, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 18 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 may be configured to perform any of the LIC techniques described in this disclosure. For instance, filter unit 216 may be configured to selectively include neighboring samples in a sub-set of neighboring samples, derive LIC parameters based on the sub-set of neighboring samples, and perform LIC based on the derived LIC parameters to generate compensated samples of the current block (e.g., which are then stored in DPB 218). In this way, video encoder 200 may be considered to include one or more processors implemented in circuitry and configured to: select a sub-set of a plurality of neighboring samples of a current block in a current picture, wherein the plurality of neighboring samples includes a row of samples adjacent to a top row of the current block in the current picture and a column of samples adjacent to a left column of the current block in the current picture, wherein, to select the sub-set of neighboring samples, the one or more processors are configured to: exclude, from the sub-set of neighboring samples, samples in the row of samples adjacent to the top row of the current block that are reconstructed based on other samples in the current picture; and exclude, from the sub-set of neighboring samples, samples in the column of samples adjacent to the left column of the current block that are reconstructed based on other samples in the current picture;

derive, based on the sub-set of the plurality of neighboring samples in the current picture, local illumination compensation (LIC) parameters for the current block; and perform, based on the LIC parameters, LIC on samples of the current block to generate compensated samples of the current block.

Figure 19:
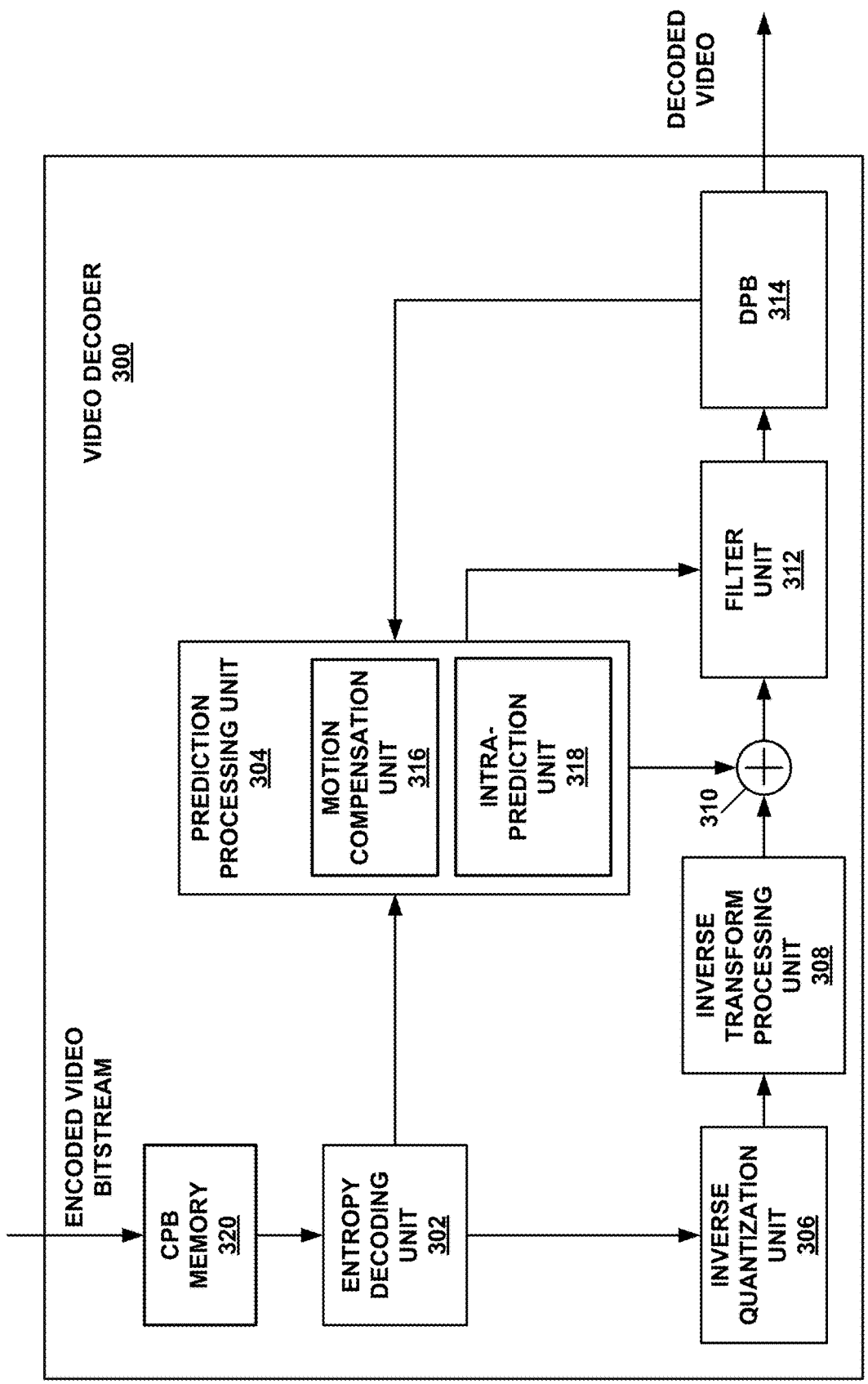
FIG. 19 is a block diagram illustrating an example video decoder that may perform the techniques of this disclosure.

FIG. 19 is a block diagram illustrating an example video decoder 300 that may perform the techniques of this disclosure. FIG. 19 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 19, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 19 are illustrated to assist with understanding the operations performed by video decoder 300. The units may be implemented as fixed-function circuits, programmable circuits, or a combination thereof. Similar to FIG. 18, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 18).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 18). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Video decoder 300 may be configured to perform any of the LIC techniques described in this disclosure. For instance, filter unit 312 may be configured to selectively include neighboring samples in a sub-set of neighboring samples, derive LIC parameters based on the sub-set of neighboring samples, and perform LIC based on the derived LIC parameters to generate compensated samples of the current block (e.g., which are then stored in DPB 314). In this way, video decoder 300 may be considered to include one or more processors implemented in circuitry and configured to: select a sub-set of a plurality of neighboring samples of a current block in a current picture, wherein the plurality of neighboring samples includes a row of samples adjacent to a top row of the current block in the current picture and a column of samples adjacent to a left column of the current block in the current picture, wherein, to select the sub-set of neighboring samples, the one or more processors are configured to: exclude, from the sub-set of neighboring samples, samples in the row of samples adjacent to the top row of the current block that are reconstructed based on other samples in the current picture; and exclude, from the sub-set of neighboring samples, samples in the column of samples adjacent to the left column of the current block that are reconstructed based on other samples in the current picture; derive, based on the sub-set of the plurality of neighboring samples in the current picture, local illumination compensation (LIC) parameters for the current block; and perform, based on the LIC parameters, LIC on samples of the current block to generate compensated samples of the current block.

Figure 20:
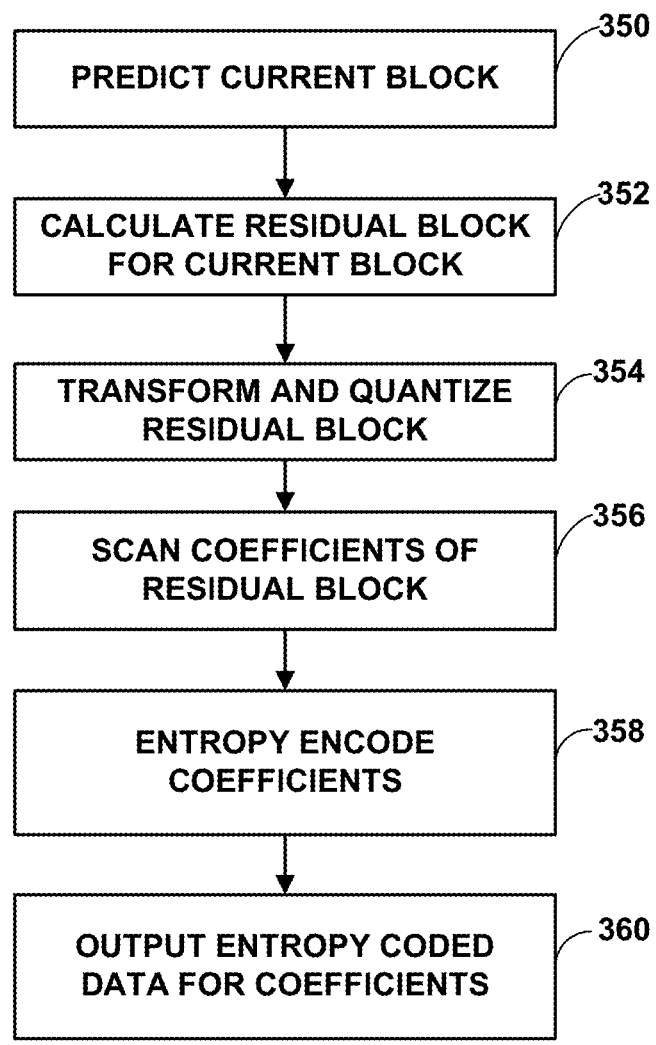
FIG. 20 is a flowchart illustrating an example method for encoding a current block.

FIG. 20 is a flowchart illustrating an example method for encoding a current block. The current block may comprise a current CU. Although described with respect to video encoder 200 (FIGS. 1 and 18), it should be understood that other devices may be configured to perform a method similar to that of FIG. 20.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360). Video encoder 200 may implement a reconstruction loop. For instance, video encoder 200 may implement a reconstruction loop to reconstruct the coded video data using the LIC techniques described in this disclosure.

Figure 21:
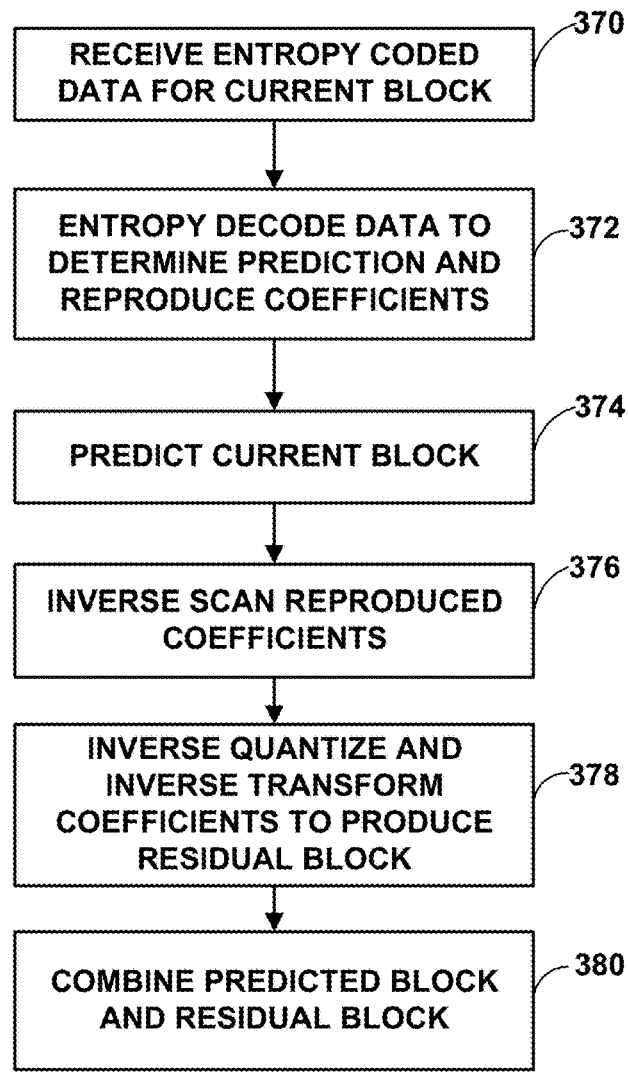
FIG. 21 is a flowchart illustrating an example method for decoding a current block of video data.

FIG. 21 is a flowchart illustrating an example method for decoding a current block of video data. The current block may comprise a current CU. Although described with respect to video decoder 300 (FIGS. 1 and 19), it should be understood that other devices may be configured to perform a method similar to that of FIG. 21.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380). Video decoder 300 may modify decoded samples of the current block using the LIC techniques described in this disclosure.

Figure 22:
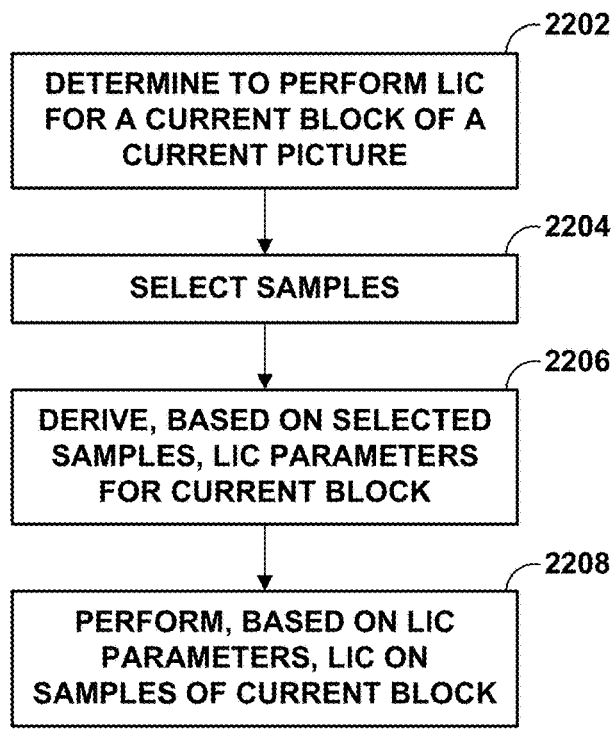
FIG. 22 is a flowchart illustrating an example method for performing LIC on a current block of video data

FIG. 22 is a flowchart illustrating an example method for performing LIC on a current block of video data. The current block may comprise a current CU. Although described with respect to video encoder 200 (FIGS. 1 and 18) and/or video decoder 300 (FIGS. 1 and 19), it should be understood that other devices may be configured to perform a method similar to that of FIG. 22.

A video coder (e.g., video encoder 200 and/or video decoder 300) may determine to perform LIC for a current block of a current picture (2202). As one example, the video coder may code a syntax element that indicates whether LIC is to be performed for the current block. As another example, the video coder may infer (e.g., without coding a syntax element that indicates whether LIC is to be performed for the current block) whether LIC is to be performed for the current block. The video coder may infer whether to perform LIC based on any available data. As one example, if the current block is coded using skip mode, the video coder may infer not to perform LIC for the current block. As another example, if there are not any transform coefficients for the current CU or all transform coefficients of the current CU are zero, the video coder may infer not to perform LIC for the current block. For instance, if the CBF flag for the current CU is zero, the video coder may infer not to perform LIC for the current block. Additionally or alternatively, if the CBF flag for a specific component of a CU (e.g., Y or Cb or Cr for YCbCr format) is zero, the video coder may infer not to perform LIC for the current block. Additionally or alternatively, if the CBF flag for a specific combination of components of a CU is zero, the video coder may infer not to perform LIC for the current block. It is noted that the combination of components can be any combination of available CU components and that the combination of components used for decision making can be predefined or signaled in the bit-stream (e.g., as one or more syntax elements).

Responsive to determining to perform LIC for the current block, the video coder may select samples from which to derive LIC parameters (2204). For instance, the video coder may evaluate neighboring samples of the current block in the current picture for inclusion in a set of samples on which the LIC parameters are derived. The neighboring samples of the current block in the current picture may include a row of samples adjacent to a top row of the current block in the current picture and a column of samples adjacent to a left column of the current block in the current picture.

In some examples, the video coder may include, in the set of samples of the current picture on which the LIC parameters are derived, neighboring samples of the current block in the current picture that are immediately available for use. A particular sample of the neighboring samples may be considered immediately available for use where the particular sample is not reconstructed based on other samples in the current picture. As such, the video coder may exclude, from the set of samples of the current picture on which the LIC parameters are derived, samples in the row of samples adjacent to the top row of the current block that are reconstructed based on other samples in the current picture and samples in the column of samples adjacent to the left column of the current block that are reconstructed based on other samples in the current picture.

The video coder may further derive the LIC parameters based on a set of a plurality of neighboring samples of a reference block of a reference picture. The reference block may be a block of video data on which samples of the current block are predicted. For instance, where the current block is coded using inter coding, the samples of the current block may be predicted by adding residual data to samples of the reference block. The plurality of neighboring samples of the reference block of the reference picture may include a row of samples adjacent to a top row of the reference block in the reference picture and a column of samples adjacent to a left column of the reference block in the reference picture.

To select the set of the plurality of neighboring samples of the reference block of the reference picture, the video coder may exclude, from the set of neighboring samples of the reference block, samples of the plurality of neighboring samples of the reference block located at relative positions corresponding to samples of the plurality of neighboring samples of the current block that are excluded from the set of neighboring samples of the current block. Further details of this technique are discussed above with reference to FIG. 16.

The video coder may derive the LIC parameters based on the selected samples (2206). For instance, where the set of neighboring samples of the current block are $Rec_{neig}$ and the set of neighboring samples of the reference block in the reference picture are $Rec_{refneig}$, the video coder may determine parameters a and b in accordance with Eq. (2) above.

The video coder may perform LIC based on the derived LIC parameters (2208). For instance, the video coder may process samples of the current block in accordance with Eq. (1) above to generate an illumination compensated version of the current block.

The following numbered examples may illustrate one or more aspects of the disclosure:

1. A method of coding video data, the method comprising any combination of the techniques described in this disclosure.

2. A method of coding video data, the method comprising: obtaining a coded video bitstream; inferring, based on other information in the coded video bitstream, whether local illumination compensation (LIC) can be used for a current block.

2.2 The method of claim 2, wherein the other information includes a skip mode syntax element.

2.4 The method of claim 2, wherein the other information includes a coded block flag syntax element.

3. A method of coding video data, the method comprising: obtaining a coded video bitstream; inferring, based on other information in the coded video bitstream, whether certain reconstructed pixels may be used for local illumination compensation (LIC) parameter derivation.

3.2 The method of claim 3, wherein the other information includes an indication that the certain reconstructed pixels are from a skip coded portion of a video frame.

3.4 The method of claim 3, wherein the other information includes an indication that the certain reconstructed pixels are from an intra coded portion of a video frame or a partially intra coded portion of the video frame.

4. A method of coding video data, the method comprising: inferring, based on availability of other pixels that may be used for local illumination compensation (LIC) parameter derivation, whether certain reconstructed pixels may be used for LIC parameter derivation.

5. The method of any combination of claims 1-4, wherein coding comprises decoding.

6. The method of any combination of claims 1-5, wherein coding comprises encoding.

7. A device for coding video data, the device comprising one or more means for performing the method of any combination of claims 1-4

8. The device of claim 7, wherein the one or more means comprise one or more processors implemented in circuitry.

9. The device of any combination of claims 7 and 8, further comprising a memory to store the video data.

10. The device of any combination of claims 7-9, further comprising a display configured to display decoded video data.

11. The device of any combination of claims 7-10, wherein the device comprises one or more of a camera, a computer, a mobile device, a broadcast receiver device, or a set-top box.

12. The device of any combination of claims 7-11, wherein the device comprises a video decoder.

13. The device of any combination of claims 7-12, wherein the device comprises a video encoder.

14. A computer-readable storage medium having stored thereon instructions that, when executed, cause one or more processors to perform the method of any combination of claims 1-4.

15. A device for encoding video data, the device comprising: means for obtaining a coded video bitstream; and one or more of: means for inferring, based on other information in the coded video bitstream, whether local illumination compensation (LIC) can be used for a current block; means for inferring, based on other information in the coded video bitstream, whether certain reconstructed pixels may be used for LIC parameter derivation; and means for inferring, based on availability of other pixels that may be used for LIC parameter derivation, whether certain reconstructed pixels may be used for LIC parameter derivation.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuity," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   selecting, by one or more processors, a set of a plurality of neighboring samples of a current block in a current picture, wherein the plurality of neighboring samples includes a row of samples adjacent to a top row of the current block in the current picture and a column of samples adjacent to a left column of the current block in the current picture, wherein selecting the sub-set of the plurality of neighboring samples comprises:
      determining that a particular sample is reconstructed based on other samples in the current picture comprises determining that the particular sample is included in a block coded with one of a plurality of specified prediction modes that includes combined intra and inter prediction (CIIP) mode, and current picture referencing (CPR) mode;
      excluding, from the set of neighboring samples, samples in the row of samples adjacent to the top row of the current block that are reconstructed based on other samples in the current picture; and
      excluding, from the set of neighboring samples, samples in the column of samples adjacent to the left column of the current block that are reconstructed based on other samples in the current picture;
   deriving, by the one or more processors and based on the set of the plurality of neighboring samples in the current picture, local illumination compensation (LIC) parameters for the current block; and
   performing, by the one or more processors and based on the LIC parameters, LIC on samples of the current block to generate compensated samples of the current block.

2. The method of claim 1, further comprising:
   coding, from a video bitstream, one or more syntax elements that indicate the plurality of specified prediction modes.

3. The method of claim 1, wherein deriving the LIC parameters for the current block comprises deriving the LIC parameters for the current block based on the set of the plurality of neighboring samples of the current block in the current picture and a set of a plurality of neighboring samples of a reference block in a reference picture, the reference block used to predict the samples of the current block, wherein the method further comprises:
selecting, by the one or more processors, the set of the plurality of neighboring samples of the reference block in the reference picture, wherein the plurality of neighboring samples of the reference block includes a row of samples adjacent to a top row of the reference block in the reference picture and a column of samples adjacent to a left column of the reference block in the reference picture.

4. The method of claim 3, wherein selecting the set of neighboring samples of the reference block comprises:
excluding, from the set of neighboring samples of the reference block, samples of the plurality of neighboring samples of the reference block located at relative positions corresponding to samples of the plurality of neighboring samples of the current block that are excluded from the set of neighboring samples of the current block.

5. The method of claim 1, wherein performing LIC comprises performing LIC in response to determining to perform LIC for the current block.

6. The method of claim 5, wherein determining to perform LIC for the current block comprises inferring whether to perform LIC for the current block.

7. The method of claim 6, wherein inferring whether to perform LIC for the current block comprises determining whether to perform LIC for the current block based on whether the current block is coded using skip mode.

8. The method of claim 6, wherein inferring whether to perform LIC for the current block comprises determining whether to perform LIC for the current block based on a value of a coded block flag for the current block.

9. The method of claim 1, wherein the one or more processors are included in a video decoder.

10. The method of claim 1, wherein the one or more processors are included in a video encoder.

11. An apparatus for processing video data, the apparatus comprising:
one or more storage media; and
one or more processors implemented in circuitry and configured to:
select a set of a plurality of neighboring samples of a current block in a current picture, wherein the plurality of neighboring samples includes a row of samples adjacent to a top row of the current block in the current picture and a column of samples adjacent to a left column of the current block in the current picture, wherein, to select the sub-set of neighboring samples, the one or more processors are configured to:
determine that a particular sample is reconstructed based on other samples in the current picture comprises determining that the particular sample is included in a block coded with one of a plurality of specified prediction modes that includes combined intra and inter prediction (CIIP) mode, and current picture referencing (CPR) mode;
exclude, from the set of neighboring samples, samples in the row of samples adjacent to the top row of the current block that are reconstructed based on other samples in the current picture; and
exclude, from the set of neighboring samples, samples in the column of samples adjacent to the left column of the current block that are reconstructed based on other samples in the current picture;
derive, based on the set of the plurality of neighboring samples in the current picture, local illumination compensation (LIC) parameters for the current block; and
perform, based on the LIC parameters, LIC on samples of the current block to generate compensated samples of the current block.

12. The apparatus of claim 11, wherein the one or more processors are further configured to:
code, from a video bitstream, one or more syntax elements that indicate the plurality of specified prediction modes.

13. The apparatus of claim 11, wherein, to derive the LIC parameters for the current block, the one or more processors configured to derive the LIC parameters for the current block based on the set of the plurality of neighboring samples of the current block in the current picture and a set of a plurality of neighboring samples of a reference block in a reference picture, the reference block used to predict the samples of the current block, wherein the one or more processors are further configured to:
select the set of the plurality of neighboring samples of the reference block in the reference picture, wherein the plurality of neighboring samples of the reference block includes a row of samples adjacent to a top row of the reference block in the reference picture and a column of samples adjacent to a left column of the reference block in the reference picture.

14. The apparatus of claim 13, wherein, to select the set of neighboring samples of the reference block, the one or more processors are configured to:
exclude, from the set of neighboring samples of the reference block, samples of the plurality of neighboring samples of the reference block located at relative positions corresponding to samples of the plurality of neighboring samples of the current block that are excluded from the set of neighboring samples of the current block.

15. The apparatus of claim 11, wherein, to perform LIC, the one or more processors are configured to perform LIC in response to determining to perform LIC for the current block.

16. The apparatus of claim 15, wherein, to determine to perform LIC for the current block, the one or more processors are configured to infer whether to perform LIC for the current block.

17. The apparatus of claim 16, wherein, to infer whether to perform LIC for the current block, the one or more processors are configured to determine whether to perform LIC for the current block based on whether the current block is coded using skip mode.

18. The apparatus of claim 16, wherein, to infer whether to perform LIC for the current block, the one or more processors are configured to determine whether to perform LIC for the current block based on a value of a coded block flag for the current block.

19. The apparatus of claim 11, wherein the one or more processors are included in a video decoder.

20. The apparatus of claim 11, wherein the one or more processors are included in a video encoder.

21. A non-transitory computer-readable storage medium having stored thereon instructions that, when executed, cause one or more processors to:
   select a set of a plurality of neighboring samples of a current block in a current picture, wherein the plurality of neighboring samples includes a row of samples adjacent to a top row of the current block in the current picture and a column of samples adjacent to a left column of the current block in the current picture, wherein the instructions that cause the one or more processors to select the sub-set of neighboring samples comprise instructions that cause the one or more processors to:
      determine that a particular sample is reconstructed based on other samples in the current picture comprises determining that the particular sample is included in a block coded with one of a plurality of specified prediction modes that includes combined intra and inter prediction (CIIP) mode, and current picture referencing (CPR) mode;
      exclude, from the set of neighboring samples, samples in the row of samples adjacent to the top row of the current block that are reconstructed based on other samples in the current picture; and
      exclude, from the set of neighboring samples, samples in the column of samples adjacent to the left column of the current block that are reconstructed based on other samples in the current picture;
   derive, based on the set of the plurality of neighboring samples in the current picture, local illumination compensation (LIC) parameters for the current block; and
   perform, based on the LIC parameters, LIC on samples of the current block to generate compensated samples of the current block.

22. A device for coding video data, the device comprising:
   means for selecting a set of a plurality of neighboring samples of a current block in a current picture, wherein the plurality of neighboring samples includes a row of samples adjacent to a top row of the current block in the current picture and a column of samples adjacent to a left column of the current block in the current picture, wherein the means for selecting comprise:
      means for determining that a particular sample is reconstructed based on other samples in the current picture comprises determining that the particular sample is included in a block coded with one of a plurality of specified prediction modes that includes combined intra and inter prediction (CIIP) mode, and current picture referencing CPR) mode;
      means for excluding, from the set of neighboring samples, samples in the row of samples adjacent to the top row of the current block that are reconstructed based on other samples in the current picture; and
      means for excluding, from the set of neighboring samples, samples in the column of samples adjacent to the left column of the current block that are reconstructed based on other samples in the current picture;
   means for deriving, based on the set of the plurality of neighboring samples in the current picture, local illumination compensation (LIC) parameters for the current block; and
   means for performing, based on the LIC parameters, LIC on samples of the current block to generate compensated samples of the current block.

* * * * *